United States Patent
Sato

(10) Patent No.: US 7,636,726 B2
(45) Date of Patent: Dec. 22, 2009

(54) ELECTRONIC APPARATUS THAT RECORDS FOLDER STRUCTURE ON REPLACEABLE RECORDING MEDIUM

(75) Inventor: Tsuneo Sato, Asaka (JP)

(73) Assignee: Fujifilm Corporation, Tokyo (JP)

( * ) Notice: Subject to any disclaimer, the term of this patent is extended or adjusted under 35 U.S.C. 154(b) by 430 days.

(21) Appl. No.: 10/891,039

(22) Filed: Jul. 15, 2004

(65) Prior Publication Data

US 2005/0015410 A1 Jan. 20, 2005

(30) Foreign Application Priority Data

Jul. 16, 2003 (JP) .............................. 2003-275375

(51) Int. Cl.
G06F 17/00 (2006.01)

(52) U.S. Cl. .................... 707/101; 707/102; 707/204

(58) Field of Classification Search .................. None
See application file for complete search history.

(56) References Cited

U.S. PATENT DOCUMENTS

| | | | | |
|---|---|---|---|---|
| 5,127,048 | A * | 6/1992 | Press et al. ............. | 379/100.15 |
| 6,476,929 | B1 * | 11/2002 | Tanaka ..................... | 358/1.17 |
| 6,507,363 | B1 * | 1/2003 | Anderson et al. ........ | 348/231.9 |
| 7,085,767 | B2 * | 8/2006 | Kusama .................... | 707/101 |
| 2003/0031457 | A1 * | 2/2003 | Miomo et al. ............ | 386/46 |
| 2004/0122866 | A1 * | 6/2004 | Igarashi et al. ........... | 707/104.1 |
| 2004/0133550 | A1 * | 7/2004 | Okamura .................. | 707/1 |
| 2004/0175764 | A1 * | 9/2004 | Nishiyama et al. ........... | 435/7.2 |
| 2004/0199687 | A1 * | 10/2004 | Hsu et al. ..................... | 710/74 |
| 2005/0108291 | A1 * | 5/2005 | Watanabe ................... | 707/200 |

FOREIGN PATENT DOCUMENTS

| | | |
|---|---|---|
| JP | 8-63869 | 3/1996 |
| JP | 8-249863 | 9/1996 |
| JP | 11-45510 | 2/1999 |
| JP | 11-045510 | * 2/1999 |
| JP | 2001-109877 | 4/2001 |
| JP | 2001-169222 | 6/2001 |
| JP | 2003-37805 | 2/2003 |
| JP | 2004-193861 | 7/2004 |

OTHER PUBLICATIONS

Design rule for Camera File System, Version 1.0, JEIDA-49-2-1998, Established Dec. 1998, Japan Electronic Industry Development Association.*

* cited by examiner

*Primary Examiner*—Jean B Fleurantin
*Assistant Examiner*—Thu-Nguyet Le
(74) *Attorney, Agent, or Firm*—McGinn IP Law Group, PLLC

(57) ABSTRACT

Information on the folder structure existing in a recording medium is recorded in an EEPROM built into an electronic camera. When the recording medium is replaced, it is asked whether or not to create in the replacing recording medium folders of the same structure as those in the replaced recording medium, and when such creation is selected, folders of the same structure as those in the replaced recording medium are created in the replacing recording medium on the basis of information recorded in the EEPROM.

7 Claims, 13 Drawing Sheets

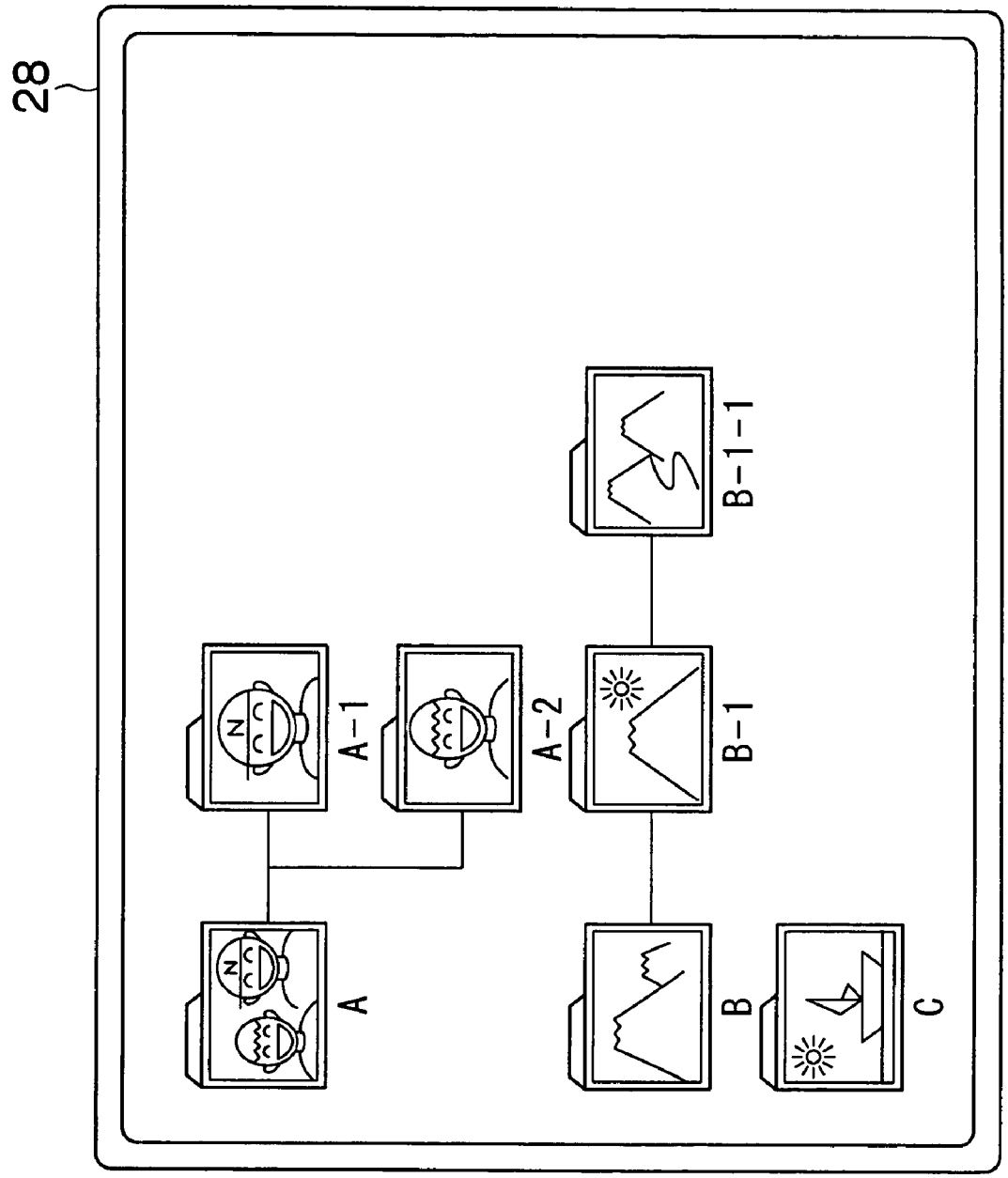

ELECTRONIC APPARATUS THAT RECORDS FOLDER STRUCTURE ON REPLACEABLE RECORDING MEDIUM

BACKGROUND OF THE INVENTION

1. Field of the Invention

The present invention relates to an electronic apparatus, and more particularly to an electronic apparatus which records data on a replaceable recording medium, such as one in an electronic camera.

2. Description of the Related Art

Usually, picture data photographed with an electronic camera are recorded on a replaceable recording medium, such as a memory card. In recording such data, the electronic camera creates a single folder on the recording medium and successively stores picture data into this folder. However, such a method of recording picture data on a single folder involves the problem of difficulty in classifying and putting in order the picture data on a subsequent occasion.

In view of this problem, the Japanese Patent Application Publication No. 2001-169222 proposes to create in advance a plurality of folders, out of which the user can select as desired the folder into which the picture data are to be recorded.

Further the Japanese Patent Application Publication No. 2003-37805 proposes to create a folder for each different shooting mode, automatically sort according to the shooting mode the folder into which the data are to be recorded and record the data into it.

SUMMARY OF THE INVENTION

However, both of the methods disclosed in the cited Publications involve the disadvantage that, when the recording medium is replaced, the folder should be set anew, which is a substantial inconvenience.

An object of the present invention, attempted in view of the circumstances noted above, is to provide an electronic apparatus which permits ready management of data recorded on a replaceable recording medium.

In order to achieve the object stated above, according to a first aspect of the invention, there is provided an electronic apparatus which records data on a replaceable recording medium comprising a folder information recording device which records information of folder structure existing in the recording medium; a detecting device which detects the replacement of the recording medium; a selecting device which, in the event that the replacement of the recording medium has been detected by the detecting device, causes selection to be made as to whether or not folders of the same structure as folders existing in the replaced recording medium are to be created in the replacing recording medium; and a folder creating device which, when the selecting device selects creation of folders, creates folders of the same structure as folders existing in the replaced recording medium in the replacing recording medium on the basis of information recorded in the folder information recording device.

According to the first aspect of the invention, information on the folder structure existing in the recording medium is recorded in the folder information recording device. When the recording medium is replaced, selection is made as to whether or not folders of the same structure as folders existing in the replaced recording medium are to be created in the replacing recording medium. In the event of selecting folder creation, folders of the same structure as folders existing in the replaced recording medium are created in the replacing recording medium on the basis of information recorded in the folder information recording device. This makes possible continued use of folders created before the replacement.

In order to achieve the object stated above, according to a second aspect of the invention, the electronic apparatus is further comprising: a display control device which causes a display device to display all the folders existing in the recording medium in folder icons appended with pictures on the basis of information recorded in the folder information recording device, wherein the folder information recording device records information on pictures to be appended to folder icons of individual folders together with information on the folder structure existing in the recording medium.

According to the second aspect of the invention, the folder information recording device records information on pictures to be appended to folder icons of individual folders together with information on the folder structure existing in the recording medium. The display control device causes the display device to display all the folders existing in the recording medium in folder icons appended with pictures on the basis of information recorded in this folder information recording device. This appending of pictures to folder icons enables the user to grasp the contents of each folder by only seeing its icon, and makes data management even easier.

Since the invention makes possible continued use of folders existing in a replaced recording medium after its replacement with another recording medium. This eliminates the need to set the folders after the replacement of the recording medium, resulting in improved handling ease. The continued use of folders of the same structure even after the replacement of the recording medium also makes it possible to classify and put in order the data more easily.

BRIEF DESCRIPTION OF THE DRAWINGS

FIG. 3 shows an example of screen showing all the folders listed on a picture display unit.

FIGS. 10A to 19B illustrate an "icon picture deleting mode".

FIG. 12 is a flow chart of the procedure of handing over folder management information when the recording medium is replaced.

DETAILED DESCRIPTION OF THE PREFERRED EMBODIMENTS

An electronic apparatus, which is a preferred embodiment of the present invention, will be described in detail below with reference to the accompanying drawings.

Figure 1:
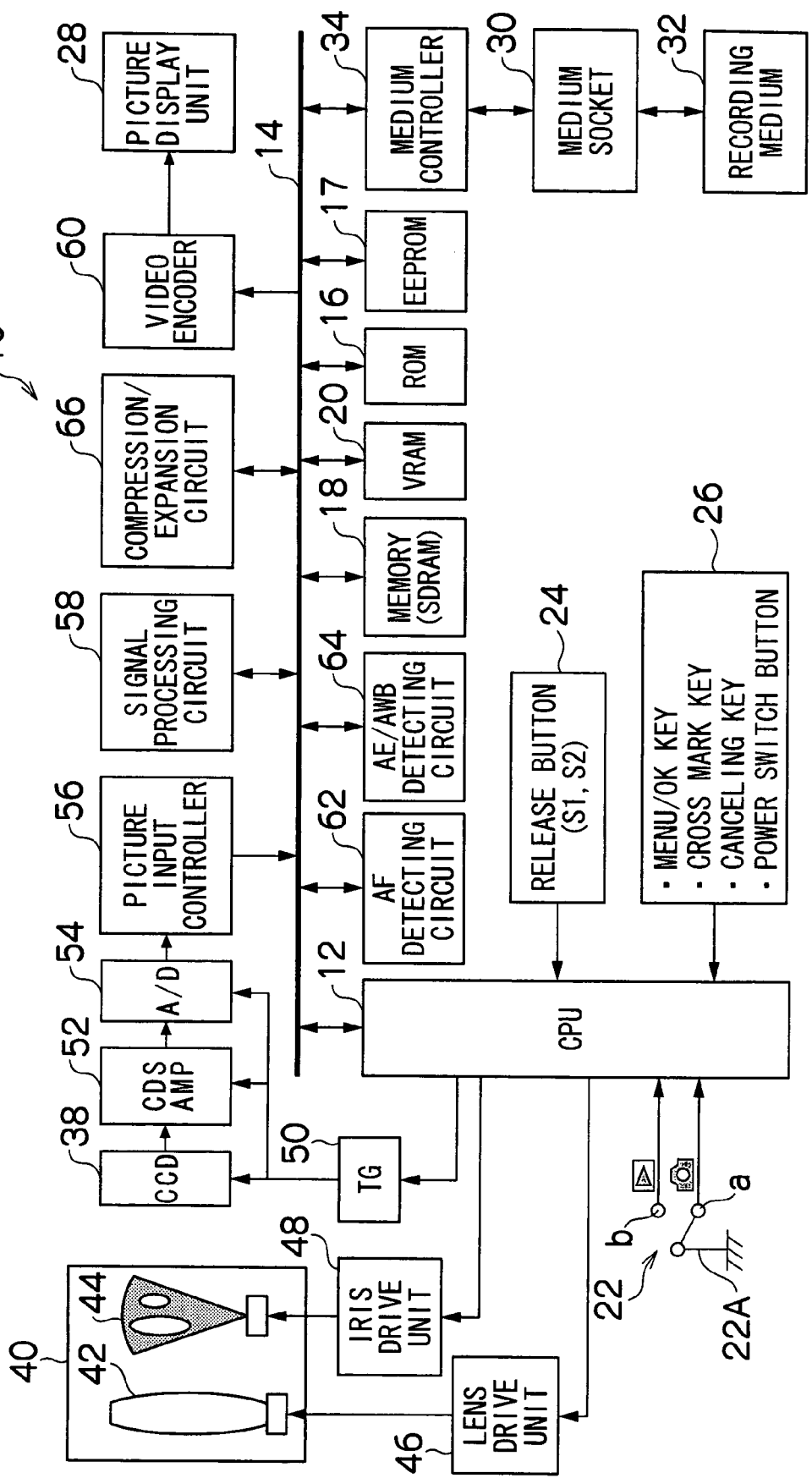
FIG. 1 is a block diagram showing an electronic camera, which is a preferred embodiment of the present invention.

FIG. 1 is a block diagram showing an electronic camera, which is a preferred embodiment of the present invention. This electronic camera 10 has a function to edit picture files recorded on a recording medium in addition to recording and playing back still pictures.

The overall operation of the electronic camera 10 is under integrated control of a central processing unit (CPU) 12. The CPU 12 functions not only as a control device to control this camera system in accordance with a prescribed program, but also as an arithmetic device to execute various computations including automatic exposure (AE) computation, automatic focusing (AF) computation and white balance (WB) regulating computation. In a ROM 16 connected to the CPU 12 via a bus 14 are stored programs to be executed by this CPU 12 and various necessary data for control, and in an EEPROM 17 are stored various items of set information regarding the operation of the electronic camera 10 including folder management information. A memory (SDRAM) 18, besides being used as a computation work area by the CPU 12, is also utilized as a temporary storage area for picture data and voice data, while a VRAM 20 provides a dedicated temporary storage area for picture data.

The electronic camera 10 is provided with an operational device 26 including a menu/OK button, a canceling button, a cross mark button and a power switch button in addition to a mode selection switch 22 and a release button 24. Operation signals from these operational units (22 through 26) are entered into the CPU 12. The CPU 12 controls various circuits of the electronic camera 10 in accordance with operation signals from these operational units to perform lens drive control, shooting action control, picture processing control, recording/reproduction control for picture data, and display control.

The mode selection switch 22 is a switch for switching over the operational mode of the camera. When a movable contact piece 22A is connected to a contact a by manipulating this mode selection switch 22, its operation signal is entered into the CPU 12, and the camera is set to a "shooting mode". Or when the movable contact piece 22A is connected to a contact b by manipulating the mode selection switch 22, its operation signal is entered into the CPU 12, the camera is set to a "playback mode". Setting of the electronic camera 10 to the "shooting mode" makes possible recording of still pictures, and setting it to the "playback mode" makes possible playing back of recorded pictures.

The release button 24, which is a button for entering an instruction to start shooting, is a two-step stroke switch having an S1switch which is turned ON when pressed halfway and an S2switch which is turned ON only when fully pressed. When the release button 24 is pressed halfway in the shooting mode, an S1ON signal is entered into the CPU 12, and AE and AF controls are executed. When the button is fully pressed, an S2ON is entered into the CPU 12, and shooting and recording controls are executed.

The menu/OK button is an operational button combining the function of a menu button for instructing to display a menu on a picture display unit 28 and a function of an OK button for instructing to enter and execute a selected action. The canceling button functions as an operational button for instructing to cancel an earlier instruction or to return to the state of operation immediately before.

The cross mark button, which is an operational button for entering instructions in four directions including up, down, right and left, functions as an operational button to instruct selection of an item from the menu screen and to instruct selection of a set item from each item. The up/down segment of this cross mark button functions as a zooming button in the shooting mode or a playback zooming button at the time of playing back, while the right/left segment functions as a frame-by-frame playback button in the playback mode.

The picture display unit 28 is configured of a liquid crystal display capable of color displaying. This picture display unit 28 can be used not only as an electronic view finder for checking the shooting angle at the time of shooting but also as a device for playing back recorded pictures. Furthermore, this picture display unit 28 is also used for displaying user interface screens, and displays menu information, items available for selection, and set contents. Some other display unit than a liquid crystal display, such as an organic EL, can be used instead.

The electronic camera 10 has a medium socket (medium receptacle) 30, and a recording medium 32 is detachably loaded into this medium socket 30. The suitable form of recording medium is not limited to any specific one, but it may be selected out of semiconductor memory cards including xD-PictureCard (™) and SmartMedium (™), a portable small hard disk, magnetic disk, optical disk, a photomagnetic disk and others.

A medium controller 34 performs required signal conversion to accept and deliver input/output signals suitable for the recording medium 32 to be loaded into the medium socket 30.

Next will be described the shooting function and playback function of the electronic camera 10, which is this preferred of the invention.

When the shooting mode is selected with the mode selection switch 22, power is supplied to a pickup unit including a color CCD solid pickup element (hereinafter abbreviated to CCD) 38 to ready the camera for shooting pictures.

A lens unit 40 is an optical unit comprising pickup lenses 42 including a focusing lens and an iris-cum-mechanical shutter 44. The pickup lenses 42 and the iris-cum-mechanical shutter 44 are driven by a lens drive unit 46 an iris drive unit 48, and the control of the driving of these lens drive unit 46 and the iris drive unit 48 by the CPU 12 results in zooming control, focusing control and iris control.

Light having passed the lens unit 40 forms an image on the light receiving face of the CCD 38. On the light receiving face of the CCD 38 are two-dimensionally arrayed many photodiodes (light receiving elements), and primary color filters of red (R), green (G) and blue (B) are arranged, matching the photodiodes, in a prescribed array structure (Bayer, G stripe, and so forth). The CCD 38 has an electronic shutter function to control the electric charge storing duration (shutter speed) of each photodiode, and the CPU 12 controls the electric charge storing duration in the CCD 38 via a timing generator 50. Incidentally, in place of the CCD 38, a pickup element of some other type, such as the MOS type may be used as well.

The image of the object formed on the light receiving face of the CCD 38 is converted by the photodiodes into signal charges corresponding to the quantity of incident luminous energy. The signal charges accumulated in the photodiodes are sequentially read out voltage signals (picture signals) on the basis of a drive pulse supplied by the timing generator 50, and sent to an analog processing unit (CDS/AMP) 52.

The signals supplied from the CCD 38 are sent to the analog processing unit (CDS/AMP) 52, in which R, G and B signals for each individual pixel undergo sampling hold (correlation double handling) and, after amplification, are inputted to an A/D converter 54. R, G and B signals on a dot sequence converted into digital signals by the A/D converter 54 are once stored into the memory 18 via a picture input controller 56, and then entered into a picture signal processing circuit 58.

The picture signal processing circuit 58 functions as a picture processing device including a simultaneity circuit (a processing circuit for converting color signals into simultaneous signals by interpolation to adjust spatial lags of color signals ensuing from the color filter arraying of a single-plate CCD), a white balance correcting circuit, a gamma correcting circuit, a contour correcting circuit, and luminance and color-difference signal generating circuits. It converts entered R, G and B signals into luminance signals (Y signals) and color-difference signals (Cr and Cb signals), and at the same time performs prescribed signal processing including gamma compensation. Picture data processed by the picture signal processing circuit 58 are stored into the VRAM 20.

When a shot picture is to be supplied to the picture display unit 28, the pertinent picture data are read out of the VRAM 20, and sent to a video encoder 60. The video encoder 60 converts the entered picture data into signals of a prescribed formula for displaying (for instance, composite color video signals of the NTSC formula) and supplies them to the picture display unit 28. This results in displaying of the shot picture on the picture display unit 28.

By regularly accepting picture signals from the CCD 38 and rewriting picture signals in the VRAM 20 regularly with picture data generated from those picture signals and supplying the rewritten picture data to the picture display unit 28, the image being shot is displayed on the picture display unit 28 on a real-time basis. The photographer can check the shooting angle by the image (through-the-lens image) displayed on this picture display unit 28.

When the release button 24 is pressed halfway and the S1switch is turned on, the electronic camera 10 begins AE and AF processing.

First, the picture signals accepted from the CCD 38 via the picture input controller 56 are entered into an AF detecting circuit 62 and AE/AWB detecting circuit 64.

The AE/AWB detecting circuit 64 includes a circuit which divides each screen into a plurality of (for instance 16×16) areas and adds up R, G and B signals in each divided area, and provides the cumulative sums to the CPU 12. The CPU 12 detects the brightness of the object (the luminance of the object) on the basis of the cumulative sums obtained from the AE/AWB detecting circuit 64, and computes the value of exposure suitable for shooting (shooting EV). The CPU 12 then determines the aperture stop and the shutter speed from the shooting EV and a prescribed program diagram, and obtains an appropriate quantity of exposure by controlling the electronic shutter and the iris-cum-mechanical shutter 44 of the CCD 38 in accordance with the determined stop and speed.

The AE/AWB detecting circuit 64, in automatically adjusting the white balance, computes the average color-by-color cumulative sums of R, G and B signals in each divided area, and provides the computed averages to the CPU 12. The CPU 12 figures out the R/G and B/G ratios in each divided area from the obtained respective cumulative sums of R, B and G, and determines the type of light source on the basis of the distribution if the R/G and B/G ratios so obtained in the R/G and B/G color spaces among other factors. Then, in accordance with white balance adjustment factors suitable for the type of light source so determined, gains of the adjusting circuit on R, G and B signals (white balance correction values) are so controlled that the value of each ratio become approximately, for instance 1 (i.e. the accumulated RGB ratio in a frame be R:G:B≈1:1:1), and signals on each color channel are corrected accordingly.

The AF detecting circuit 62 comprises a bypass filter passing only the high frequency components of G signals, a unit for conversion into absolute values, an AF area extracting unit for cutting out signals in a prescribed focused area (for instance the central part of the picture) and an accumulator for adding up absolute value data in the AF area, and the data of cumulative values figured out by the AF detecting circuit 62 are notified to the CPU 12. The CPU 12, while moving the focusing lens by controlling the lens drive unit 46, computes the evaluated focus values (evaluated AF values) at a plurality of AF detection points, and determines as the exact focusing position the lens position in which the evaluated value is the greatest. Then it so controls the lens drive unit 46 as to move the focusing lens to the focusing position so determined (so-called contrast AF).

When the release button 24 is pressed halfway as described above and the S1switch is turned on, AE/AF processing is performed. After that, when the release button 24 is fully pressed and the S2switch is turned on, shooting for the recording purpose is started. Thus, picture data acquired in response to the turning on of S2are converted by the picture signal processing circuit 58 into luminance/color-difference signals (Y/C signals) and, after going through prescribed processing including gamma compensation, are stored into the memory 18.

The picture data stored in the memory 18, after being compressed into a prescribed format (for instance the JPEG formula) by a compression/expansion circuit 66, is recorded as a picture file of a prescribed formula onto the recording medium 32 via the medium controller 34. In this process, the picture file is stored in a designated one among folders created in the recording medium 32. The structure of folders created in the recording medium 32 will be described in detail afterwards.

When the playback mode is selected with the mode selection switch 22, the final picture file recorded in the recording medium 32 (the last recorded picture file) is read out. This read-out picture file is expanded by the compression/expansion circuit 66 into uncompressed YC signals and, after being converted via the picture signal processing circuit 58 and the video encoder 60 into signals for display use, supplied to the picture display unit 28. This causes the visual contents of the picture data to be displayed on the screen of the picture display unit 28.

By operating the right or left segment of the cross mark button while playing back a frame of still picture, the picture data to be played back are shown frame by frame either forward or backward, and the picture file in the position of frame-by-frame playback is read out of the recording medium 32 and displayed on the picture display unit 28.

Next will be described the picture file management function of the electronic camera 10 in this mode of implementing the invention.

As described above, in the electronic camera 10 in this mode of implementing the invention, the data of shot pictures are stored in a folder designated by the user. This folder can be created by the user as he or she desires.

Figure 2:
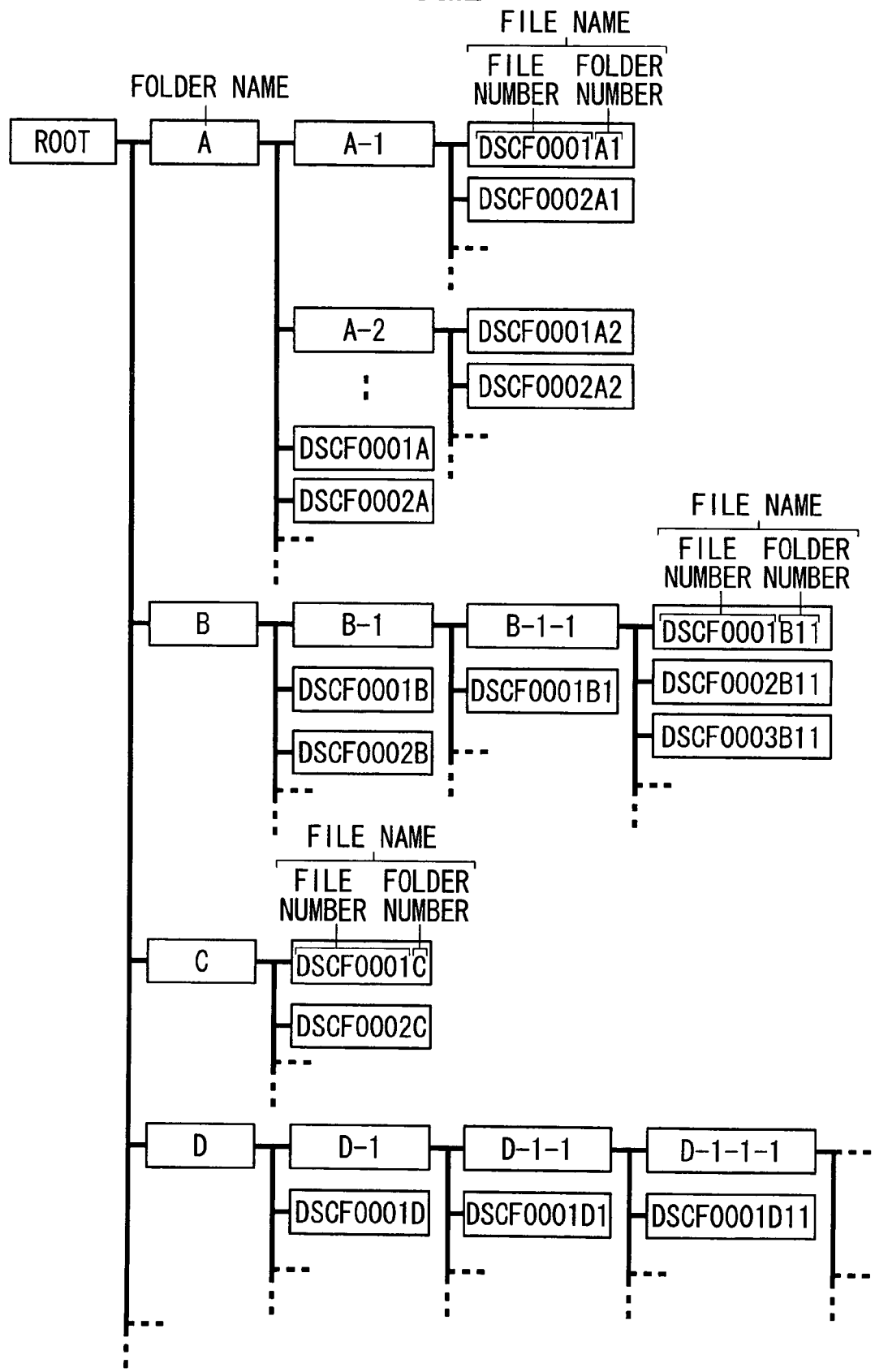
FIG. 2 is a conceptual diagram showing the structure of a folder created in a recording area of a recording medium.

FIG. 2 is a conceptual diagram showing the structure of a folder (directory) created in a recording area of the recording medium 32. As shown in the diagram, folders can be created in a hierarchical structure. Thus, with a root folder "ROOT" at the top, other lower folders can be created hierarchically (for instance to a maximum of nine levels).

Here, the folders created immediately below the root folder "ROOT" are configured as independent folders, each of which is assigned a folder name consisting of one letter of the Roman alphabet. The folder names, each consisting of one letter of the alphabet, are given in the sequence of creation, for instance "A", "B", "C", and so forth.

Each of the folders created immediately below these independent folders "A", "B", "C", . . . is assigned a folder name consisting of the name of the independent folder "A", "B", "C" or whatever else superior to it plus a "hyphen (-)" and a "numeral". For instance, folders created immediately underneath the independent folder "A" are assigned folder names "A-1", "A-2", and so forth, and folders created immediately underneath the independent folder "B" are assigned folder names "B-1", "B-2", and so forth.

Similarly, each of the folders created immediately below these folders "A-1", "A-2", and forth is assigned a folder name consisting of the name of the folder "A-1", "A-2" or whatever else immediately superior it plus a "hyphen (-)" and a "numeral". For instance, folders created immediately underneath the folder "A-1" are assigned folder names "A-1-1", "A-1-2", and so forth, and folders created immediately underneath the folder "B-1" are assigned folder names "B-1-1", "B-1-2", and so forth.

In this way, each time the position of a folder descends one level, it is assigned a folder name consisting of the name of the immediately superior folder plus a hyphen and a numeral. Therefore, the name of any folder tells from what folder it has branched out and how.

Any of the folders hierarchically created in this way can be designated for storing a given picture file. Therefore, picture files can be classified according to the purpose of shooting, and pictures can be recorded into the files so classified.

Incidentally, picture files stored in each folder are individually assigned file names by the CPU 12. These file names are also unique to each folder to avoid duplication among the files recorded in the same recording medium. Thus, "file number (DSCF****)" assigned in the sequence of recording in each folder and a "folder number", which is the original "folder name" of the folder to which the file belongs minus the hyphen (-), are combined.

For instance, as shown in FIG. 2, a picture file to be stored into the folder "A-1", if it is the first picture file to be recorded in the folder "A-1", will be identified by "DSCF0001A1", a combination of 'DSCF0001', which is the file number as such, and the folder number "A1". Or if it is the second picture file to be recorded in the folder "A-1", it will be identified by "DSCF0002A1" a combination of 'DSCF0002', which is the file number as such, and the folder number "A1".

Similarly, a picture file to be stored into the folder "A", if it is the first picture file to be recorded in the folder "A", will be identified by "DSCF0001A", a combination of 'DSCF0001', which is the file number as such, and the folder number "A". Or if it is the second picture file to be recorded in the folder "A", it will be identified by "DSCF0002A" a combination of 'DSCF0002', which is the file number as such, and the folder number "A".

Or likewise, a picture file to be stored into the folder "B-1-1", if it is the first picture file to be recorded in the folder "B-1-1", will be identified by "DSCF0001B11", a combination of 'DSCF0001', which is the file number as such, and the folder number "B11". Or if it is the second picture file to be recorded in the folder "B-1-1", it will be identified by "DSCF0002B11" a combination of 'DSCF0002', which is the file number as such, and the folder number "B11".

Similarly, a picture file to be stored into the folder "C", if it is the first picture file to be recorded in the folder "C", will be identified by "DSCF0001C", a combination of 'DSCF0001', which is the file number as such, and the folder number "C". Or if it is the second picture file to be recorded in the folder "C", it will be identified by "DSCF0002C" a combination of 'DSCF0002', which is the file number as such, and the folder number "C".

In this way, picture files to be stored into each folder are assigned file names unique to that folder to avoid duplication among the files recorded in the same recording medium. The use of the same file name consistently makes it possible to prevent, even where a picture file is captured into a personal computer, for instance, to suffer accidental overwriting of other data.

Also, assignment of file names in this way enables the user by only looking at the name of a file to recognize the folder in which the file has been stored. Thus, as the name given to any picture file is a combination of a file number as such and a folder number, the folder number in the latter immediately tells the user in which folder the picture file has been recorded.

Now, as described above, the electronic camera 10 in this mode of implementation allows the user to create folders into which picture files are to be recorded and to designate any one of his or her choice out of the folders so created for recording the data of shot pictures. The designation of the folder, as shown in FIG. 3, is carried out by having all the folders displayed on the screen of the picture display unit 28 by using folder icons and one selected out of the displayed icons.

Here, this display of all the folders is done hierarchically as shown in FIG. 3, folders at different levels being developed left to right on the screen, and folders of the same level being positioned in the same column (vertically). Thus in the example shown in FIG. 3, as the folders "A", "B" and "C" are at the same level, their folder icons are vertically arranged in the same column, and the folder icons of the folders "A-1", "A-2" and "B-1" at the level below them are vertically arranged in the next column to the right of the first column.

Further as shown in FIG. 3, each of the folder icons representing different folders is appended with a picture (icon picture), so that the content of the folder can be known by looking at this icon picture. This icon picture is created at the same time as the folder it represents. The methods of creating and editing these folder and icon picture will be described below.

A folder is created by setting the camera in a "folder creation mode". This setting of the "folder creation mode" is accomplished from menu screens.

Figure 4A:
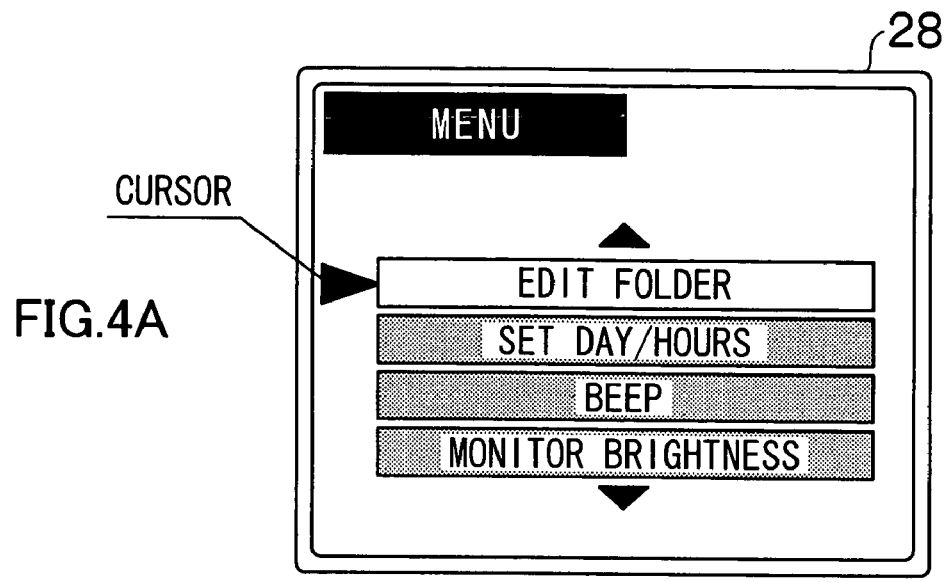
FIGS. 4A to 4C show examples of menu screen that are displayed.
Figure 4B:
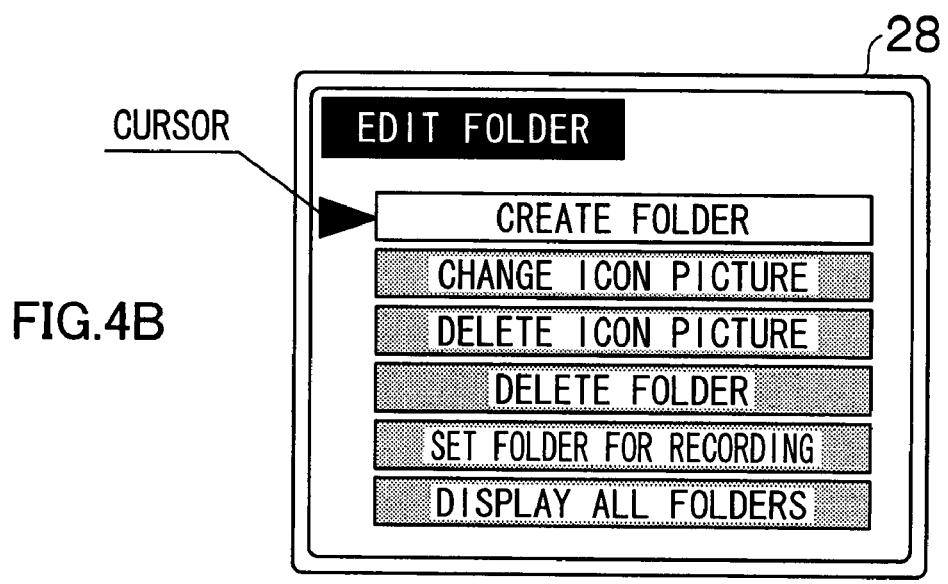
Figure 4C:
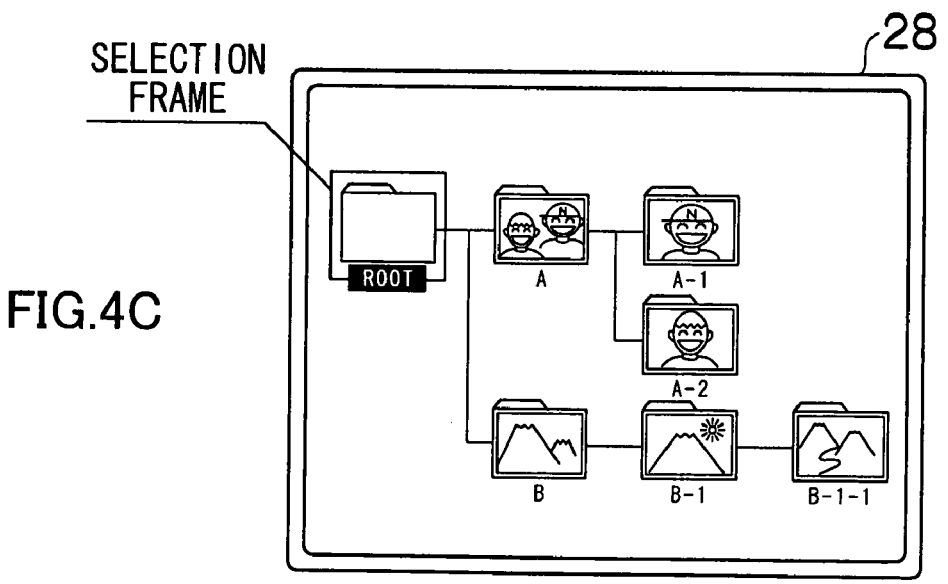

FIGS. 4A to 4C are examples of menu screen displayed. As shown therein, when the menu/OK button is pressed when the camera is set in the "shooting mode" or the "playback mode", the CPU 12 detects its pressing and, as shown in FIG. 4A, causes a menu screen to be displayed on the picture display unit 28. When "edit folder" is selected out of the menu options displayed on this menu screen, the screen of the picture display unit 28 is switched over to the menu screen of "edit folder" as shown in FIG. 4B. The "folder creation mode" is set by selecting "create folder" out of the menu options displayed on the menu screen of this "edit folder".

Incidentally out of the menu options displayed on the menu screen of this "edit folder", the "change icon picture" represents a mode of changing any already created folder icon picture (icon picture changing mode); the "delete icon picture", a mode of deleting any already created folder icon picture (icon picture deleting mode); the "delete folder", a mode of deleting any already created folder (folder deleting mode); the "set folder for recording", a mode of designating the folder in which to store shot picture data ("recording folder setting mode"); and the "display all folders", a mode of displaying all the folders created in the recording medium 32 (all folder displaying mode). These modes will be described in detail afterwards.

Selection of each menu option is done by moving the cursor to the desired option with the cross mark button, and is entered by pressing the menu/OK button.

Now, whereas the electronic camera 10 is enabled to create a folder by being set to the "folder creation mode" as described above, this "folder creation mode" differs in the subsequent procedures of creating a folder and its folder icon depending on whether it is set under the "shooting mode" or under the "playback mode". Thus, if the camera is shifted to the "folder creation mode" under the "shooting mode", the new folder will be created by the shooting action, and the picture obtained by that shooting will be displayed as its icon picture appended to the folder icon. On the other hand, if the camera is shifted to the "folder creation mode" under the "playback mode", the new folder will be created by an action to select an already shot picture, and the picture so selected will be displayed as its icon picture appended to the folder icon.

First will be described the processing that is done when the camera is shifted to the "folder creation mode" under the "shooting mode".

When, in a state in which the camera is set to the "shooting mode" as described above, the menu/OK button is pressed and, after "edit folder" is selected out of the menu screen displayed on the picture display unit 28, the "create folder" is selected out of the menu screen of "edit folder", the electronic camera 10 is set to the "folder creation mode" under the "shooting mode". Then, as the camera shifts to this "folder creation mode", all the folders represented by their respective folder icons are displayed on the picture display unit 28 as shown in FIG. 4C.

The user selects a folder, out of all these displayed folders, under which a new folder is to be created. For instance, if a new folder is to be created at a level underneath the root folder "ROOT", the root folder "ROOT" will be selected. Similarly, if a new folder is to be created at a level underneath the folder "A", the folder "A" will be selected. The selection is accomplished by shifting the selection frame with the cross mark button, and is entered by pressing the menu/OK button. The following description will suppose creation of a new folder under the root folder "ROOT".

Figure 5A:
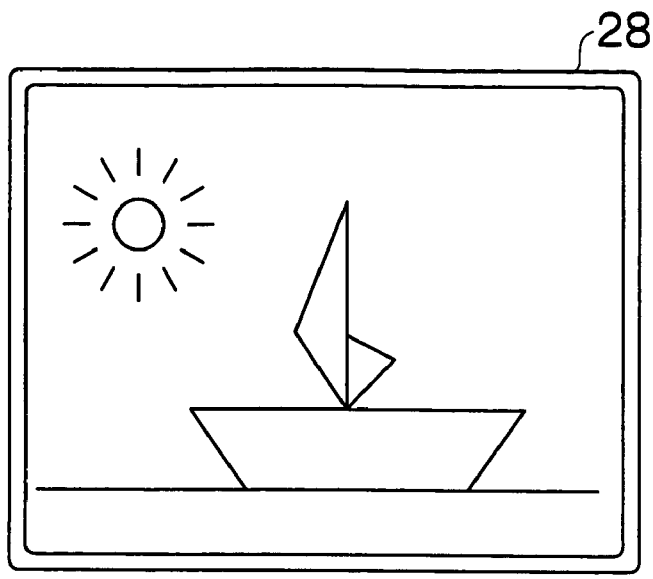
FIGS. 5A to 5C illustrate a "folder creation mode" under a "shooting mode".

After that, a through-the-lens image is displayed on the screen of the picture display unit 28 as shown in FIG. 5A. Thus, when processing to select a folder is performed, the CPU 12 detects it and so controls various circuits as to have the picture display unit 28 display a through-the-lens image. The user shoots the picture for the icon picture in this state. This shooting is accomplished by pressing the release button 24 as in usual shooting.

Figure 5B:
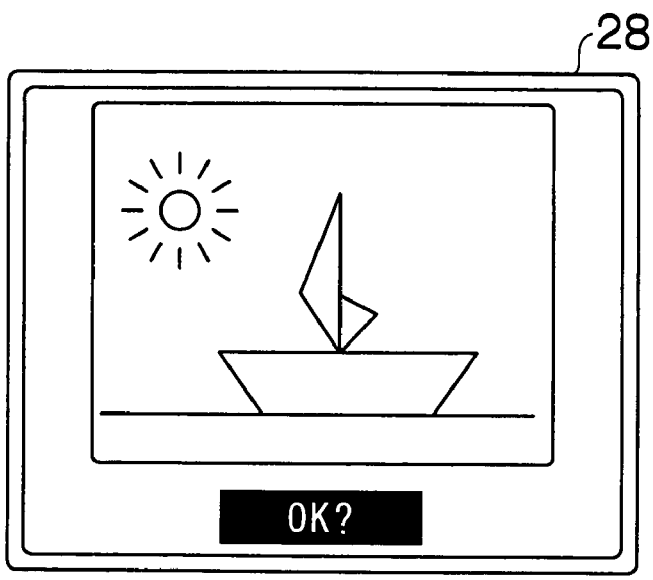

Now, when the user presses the release button 24, the CPU 12 detects it and executes processing to capture the picture, and displays the captured picture on the picture display unit 28 for preview as shown in FIG. 5B. The user looks at this picture displayed for preview and, if that picture is to be used for the icon picture, will press the menu/OK button or, if a retake is wanted, press the canceling button. If the canceling button is pressed, the through-the-lens image will be displayed again on the picture display unit 28, and the electronic camera 10 is placed in a state of standing by for shooting.

On the other hand, if the menu/OK button is pressed, another folder (folder "C") will be newly created at a level underneath the selected folder (root folder "ROOT"), and an icon picture to be appended to the folder icon of that new folder will be created on the basis of the data on the shot picture. Then information on that newly created folder and icon picture (folder management information) is recorded into an EEPROM 17. This folder management information is replaced with new information every time a folder is newly created or an existing one is deleted, or any icon picture is changed or on like occasions.

Incidentally, as the newly folder is positioned immediately underneath the root folder "ROOT" and immediately underneath the root folder "ROOT" there already exist the folder "A" and the folder "B", the newly created folder is assigned a folder name consisting of one letter "C" from the alphabet.

Figure 5C:
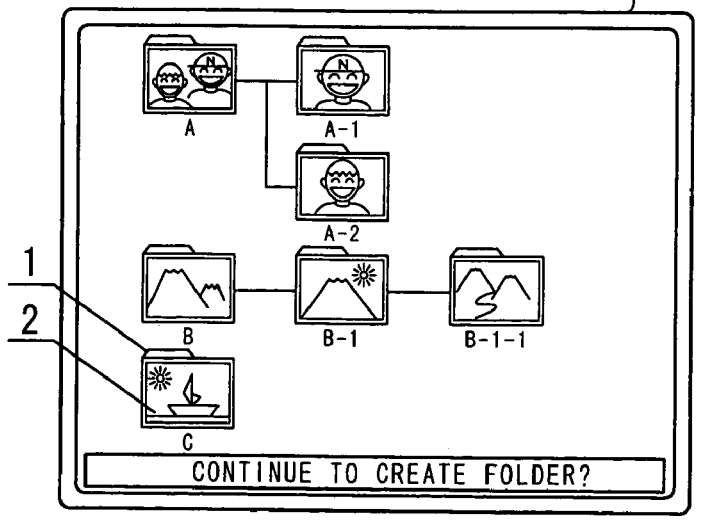

When a folder is created in this way, as shown in FIG. 5C, all the folders currently existing in the recording medium 32 including the newly created folder are displayed in folder icons on the screen of the picture display unit 28 on the basis of folder management information recorded in the EEPROM 17. By looking at all these folders displayed in folder icons on the picture display unit 28, the user can know the folder structure and the content stored in each folder currently ready in the recording medium 32.

Incidentally, each folder icon, as shown in FIG. SC, is created in a structure having a folder icon 1 of a prescribed external shape, with an icon picture 2 stuck to its inside, and is displayed on the picture display unit 28.

In the above-described sequence of actions, a folder is newly created within a prescribed superior folder, and the icon picture of that new folder is created. If processing to create another folder is to follow, the user can press the menu/OK button in a state in which all the folders are displayed as shown in FIG. SC. Or if no more processing is to be done, the user can press the canceling button. When the canceling button is pressed, the CPU 12 detects it, completes the processing of folder creation, and shifts the camera to its usual "shooting mode".

When the menu/OK button is pressed, the CPU 12 detects it, switches over the display on the picture display unit 28 to a through-the-lens image, and returns the electronic camera 10 to a state of standing by for shooting. After that, when the release button 24 is pressed, the CPU 12 detects it, executes capturing of a picture, and displays the captured picture on the picture display unit 28 for preview. Looking at the picture displayed for preview, the user, if it is to be used as the icon picture, will press the menu/OK button or, if a retake is wanted, press the canceling button.

If the canceling button is pressed, the through-the-lens image will be displayed on the picture display unit 28 again, and the electronic camera 10 will return to a state of standing by for shooting to make possible reshooting.

On the other hand, if the menu/OK button is pressed, a folder "C-1" will be newly created at the level underneath the just created folder "C", and the icon picture of that newly created folder "C-1" will be created on the basis of the shot picture. Then the folder management information recorded in the EEPROM 17 is updated, and all the folders currently existing in the recording medium 32 will displayed in folder icons on the picture display unit 28 on the basis of the updated folder management information.

When folders are consecutively created under the "folder shooting mode" in this way, folders are newly created at the level underneath the just created folder. Thus, folders are created in a hierarchical structure.

Next will be described the processing that is done when the camera is shifted to the "folder creation mode" under the "playback mode".

When the camera is set in the "playback mode", if the menu/OK button is pressed and, after selecting "edit folder" from the menu screen displayed on the picture display unit 28, "create folder" is selected from the menu screen of "edit folder", the electronic camera 10 will be set in the "folder creation mode" under the "playback mode".

When the camera shifts to the "folder creation mode", all the folders will be displayed in folder icons on the screen of the picture display unit 28 (see FIG. 4C). The user selects out of all these displayed folders the folder underneath which a folder is to be newly created. It is supposed here that a folder is newly created at the level underneath the root folder "ROOT".

Figure 6A:
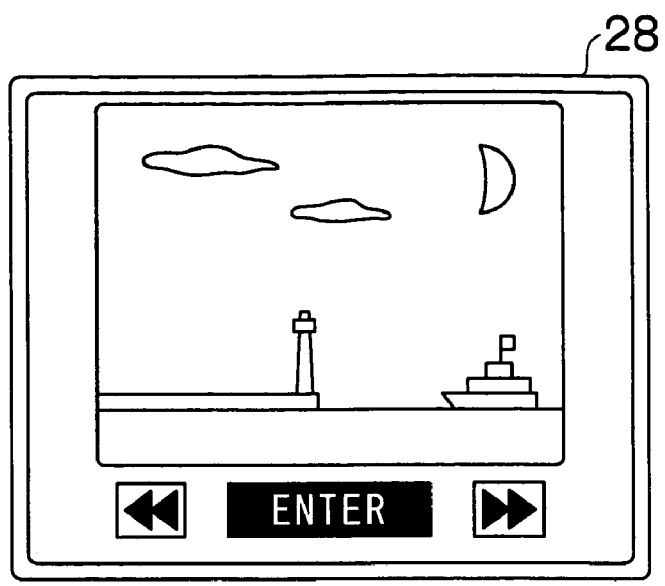
FIGS. 6A to 6C illustrate a "folder creation mode" under a "playback mode".

After that, on the screen of the picture display unit 28 pictures recorded in the recording medium 32 are played back and displayed as shown in FIG. 6A. Thus, when processing for folder selection takes place, the CPU 12 detects it and so controls various circuits as to have the shot pictures played back and displayed on the picture display unit 28.

Pictures are played back here, for instance, in the alphabetical order of folder names assigned to folders. Thus in the case shown in FIG. 4C, picture files stored in the folder "A" are first played back and displayed, followed by the folder "A-1", the folder "A-2", the folder "B", the folder "B-1" and the folder "B-1-1" in that order. Frame-by-frame playback of pictures is accomplished with the right or left segment of the cross mark button; pressing the right part results in forward, and pressing the left part results in backward, frame-by-frame playback.

The user causes the picture files recorded in the recording medium 32 to be played back and displayed on the picture display unit 28 sequentially. When the picture to be used as the icon picture is displayed on the picture display unit 28, the user presses the menu/OK button.

Figure 6B:
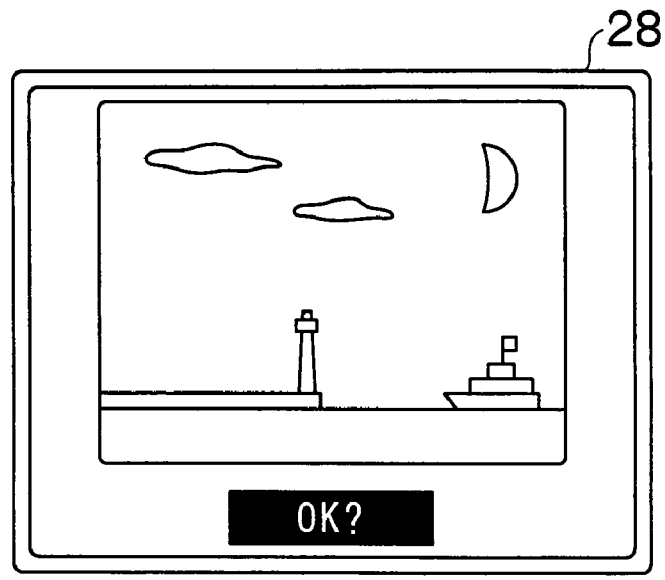

When the menu/OK button is pressed, the selected picture is displayed again on the picture display unit 28 as shown in FIG. 6B. When this picture displayed on the picture display unit 28 is to be used as the icon picture, the user can press the menu/OK button or, if he or she desires to select another picture, can press the canceling button. If the canceling button is pressed, recorded pictures will be again played back and displayed on the picture display unit 28 and wait for selection.

On the other hand, if the menu/OK button is pressed, a folder (folder "C") will be newly created at the level underneath the selected folder (the root folder "ROOT"), and the icon picture for that newly created folder will be created on the basis of the picture data of the selected picture.

Incidentally, as the newly folder is positioned immediately underneath the root folder "ROOT" and immediately underneath the root folder "ROOT" there already exist the folder "A" and the folder "B", the newly created folder is assigned a folder name consisting of one letter "C" from the alphabet.

Figure 6C:
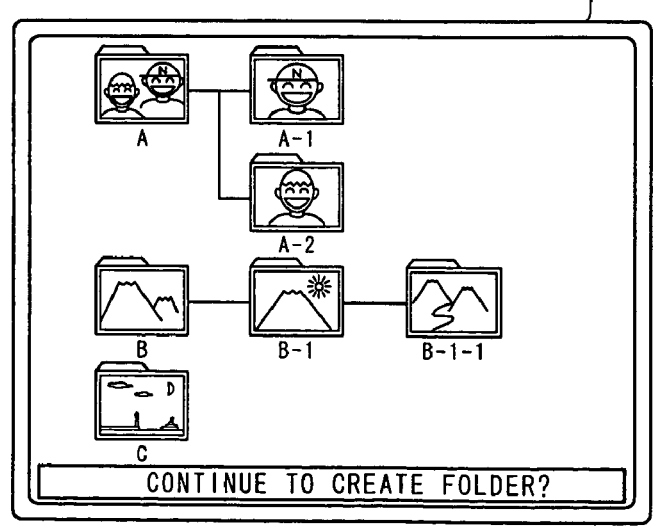

When a folder and an icon picture are created in this way, folder management information recorded in the EEPROM 17 is updated, and all the folders currently existing in the recording medium 32 are displayed in folder icons appended with icon pictures on the picture display unit 28 on the basis of the updated folder management information as shown in FIG. 6C.

In the above-described sequence of actions, a folder is newly created within a prescribed superior folder, and the icon picture of that new folder is created. If processing to create another folder is to follow, the user can press the menu/OK button in a state in which all the folders are displayed as shown in FIG. 6C. Or if no more processing is to be done, the user can press the canceling button. When the canceling button is pressed, the CPU 12 detects it, completes the processing of folder creation, and shifts the camera to its usual "shooting mode".

When the menu/OK button is pressed, the CPU 12 detects it, and causes recorded pictures to be played back and displayed on the picture display unit 28. After that, if the menu/OK button is pressed and the picture to be used as the icon picture is selected, the CPU 12 detects it and causes the selected picture to be displayed again on the picture display unit 28. Looking at this picture displayed on the picture display unit 28, the user, if it is to be used as the icon picture, will press the menu/OK button or, if selection of another picture is desired, will press the canceling button.

If the canceling button is pressed, recorded pictures will be again played back and displayed on the picture display unit 28, and the electronic camera 10 will enter a state of waiting for selection.

On the other hand, if the menu/OK button is pressed, a folder "C-1" will be newly created at the level underneath the just created folder "C", and the icon picture of that newly created folder "C-1" will be created on the basis of the shot picture. Then the folder management information recorded in the EEPROM 17 is updated, and all the folders currently existing in the recording medium 32 will displayed in folder icons appended with icon pictures on the picture display unit 28 on the basis of the updated folder management information.

When folders are consecutively created under the "folder shooting mode" in this way, folders are newly created at the level underneath the just created folder as is the case under the shooting mode.

In this way, when a mode of the camera is set to the "folder creation mode" under the "shooting mode" or the "playback mode", folders are created depending on the respective mode.

Next will be described the procedure of operating in the "icon picture changing mode" in which any icon picture in an already created folder is to be changed.

As described above, the "icon picture changing mode" is set from a menu screen. Thus, when the menu/OK button is pressed in a state in which the camera is set in the "shooting mode" or the "playback mode", a menu screen is displayed on the picture display unit 28 (see FIG. 7A); by selecting "edit folder" from this menu screen and further selecting "change icon picture" from the menu screen of "edit folder" (see FIG. 7B), the camera is set to the "icon picture changing mode".

Here, in this "icon picture changing mode", as is the case in the "folder creation mode" described above, differs in the subsequent procedure of changing the icon depending on whether it is set under the "shooting mode" or under the "playback mode". Thus, if the camera is shifted to the "icon picture changing mode" under the "shooting mode", the new icon picture will be created on the basis of the picture shot on the spot, while if the camera is shifted to the "icon picture changing mode" under the "playback mode", the new icon will be created on the basis of a picture selected from already shot pictures.

First will be described the processing that takes place when the camera shifts to the "icon picture changing mode" under the "shooting mode".

Figure 7A:
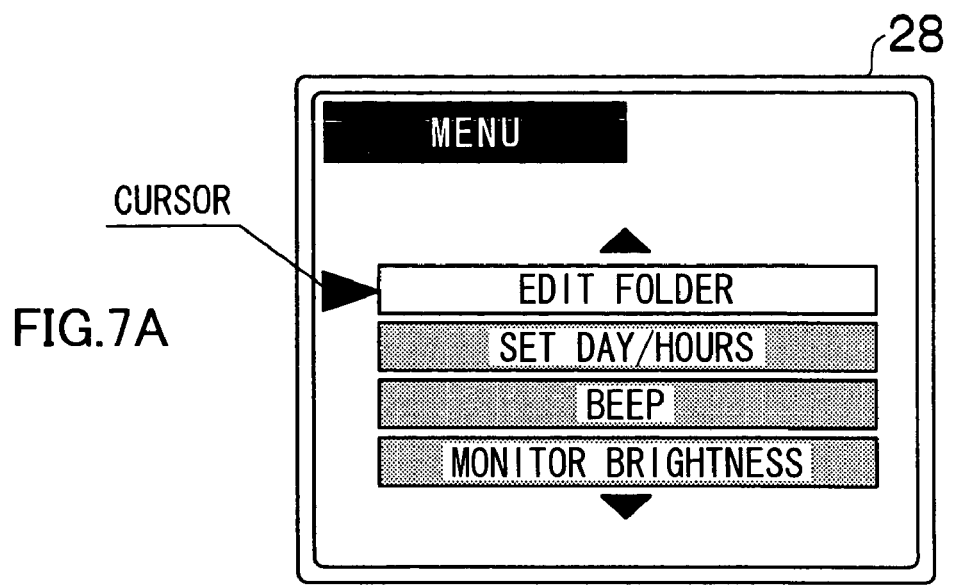
FIGS. 7A to 7C show examples of menu screen displayed.
Figure 7B:
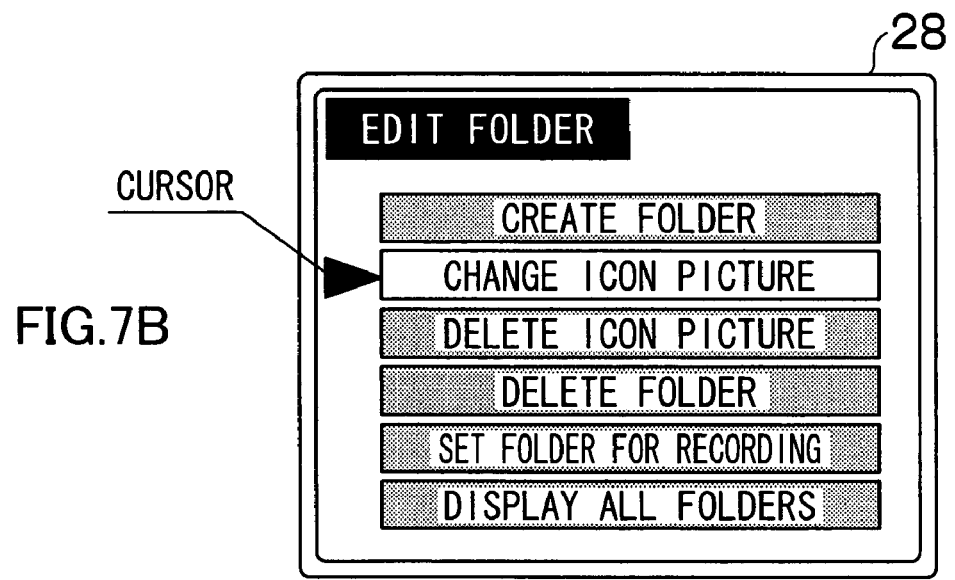

As is the case in the icon creation mode, when the menu/OK button is pressed in a state in which the camera is set to the "shooting mode", a menu screen is displayed on the picture display unit 28 as shown in FIG. 7A. The user selects "edit folder" out of the menu options displayed on this menu screen. When this "edit folder" is selected, as the display on the picture display unit 28 is changed to the menu screen of "edit folder" as shown in FIG. 7B, the user selects "change icon picture" out of the menu options of this "edit folder".

Figure 7C:
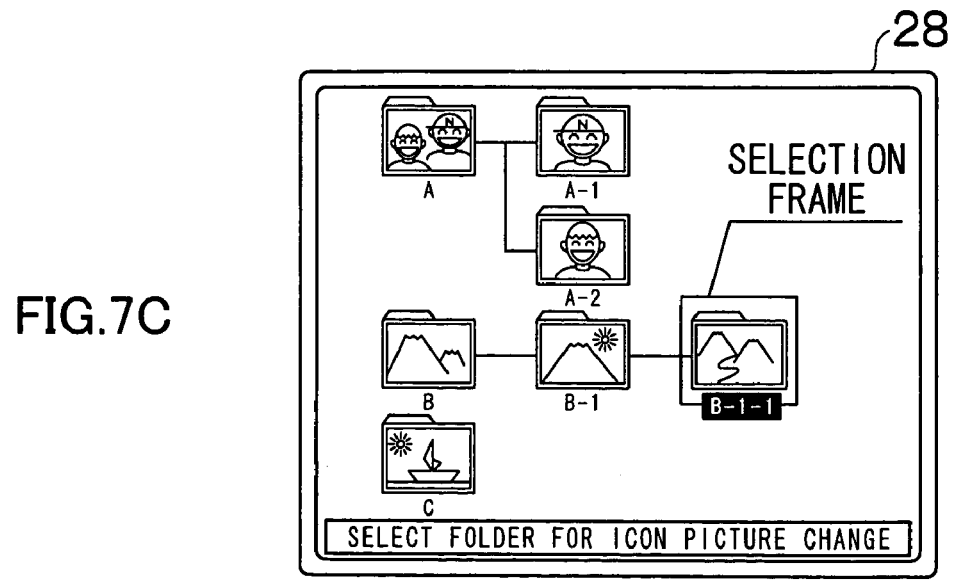

When "change icon picture" is selected out of the menu options of the "edit folder", the electronic camera 10 is set to the "icon picture changing mode" under the "shooting mode". Then, as the camera shifts to this "icon picture changing mode", all the folders are displayed in folder icons on the screen of the picture display unit 28 as shown in FIG. 7C. The user selects out of these folders displayed on the picture display unit 28 the folder whose icon picture is to be changed. For instance, where the icon picture of the folder "A" is to be changed, the folder "A" is selected or, where the icon picture of the folder "A-1" is to be changed, the folder "A-1" is selected. The selection is accomplished by shifting the selection frame with the cross mark button, and is entered by pressing the menu/OK button. The following description will suppose changing the icon picture of the folder "B-1-1".

Figure 8A:
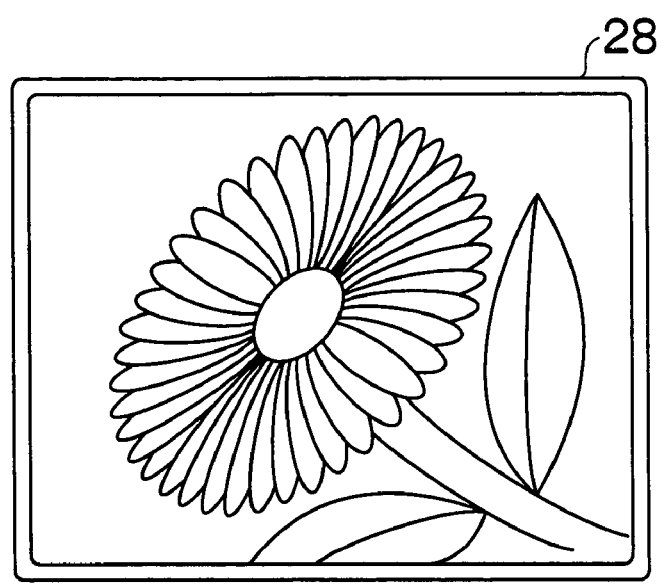
FIGS. 8A to 8C illustrate an "icon picture altering mode" under a "shooting mode".

After this, a through-the-lens image is displayed on the screen of the picture display unit 28 as shown in FIG. 8A. Thus, when folder selection is processed, the CPU 12 detects it and so controls various circuits as to have the picture display unit 28 display a through-the-lens image. The user shoots the picture for the icon picture in this state. This shooting is accomplished by pressing the release button 24 as in usual shooting.

Figure 8B:
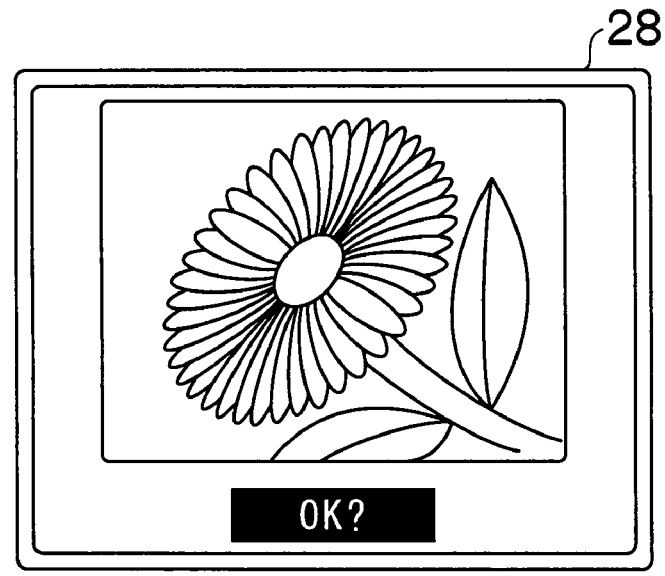

Now, when the user presses the release button 24, the CPU 12 detects it and executes processing to capture the picture, and displays the captured picture on the picture display unit 28 for preview as shown in FIG. 8B. The user looks at this picture displayed for preview and, if that picture is to be used for the icon picture, will press the menu/OK button or, if a retake is wanted, press the canceling button. If the canceling button is pressed, the through-the-lens image will be displayed again on the picture display unit 28, and the electronic camera 10 is placed in a state of standing by for shooting.

Figure 8C:
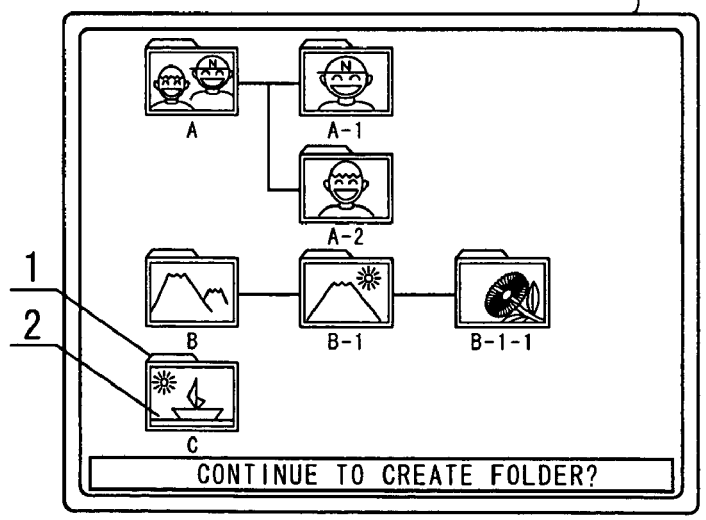

On the other hand, if the menu/OK button is pressed, an icon picture will be newly created on the basis of that shot picture, and the folder management information recorded in the EEPROM 17 will be updated. Thus, the information on the icon picture of the selected folder is overwritten by the newly created icon picture. Then as shown in FIG. 8C, all the folders existing in the recording medium 32 will be displayed in folder icons appended with icon pictures on the picture display unit 28 using that newly created.

The icon picture of the prescribed folder is changed in the sequence of operations described above. If processing to change another icon picture is to follow, the user can press the menu/OK button in a state in which all the folders are displayed as shown in FIG. 8C. Or if no more processing is to be done, the user can press the canceling button. When the canceling button is pressed, the CPU 12 detects it, completes the processing of folder change, and shifts the camera to its usual "shooting mode".

Next will be described the processing that is done when the camera is shifted to the "icon picture changing mode" under the "playback mode".

When the menu/OK button is pressed in a state in which the camera is set to the "playback mode" as described above and, after selecting "edit folder" from the menu screen displayed on the picture display unit 28, the electronic camera 10 is set to the "icon picture changing mode" under the "playback mode". Then, as the camera shifts to this "icon picture changing mode", as is the case under the "shooting mode", all the folders are displayed in folder icons appended with icon pictures on the screen of the picture display unit 28 (see FIG. 7C). The user selects out of these displayed folders the folder whose icon picture is to be changed. Incidentally, the following description will suppose changing the icon picture of the folder "B-1-1".

Figure 9A:
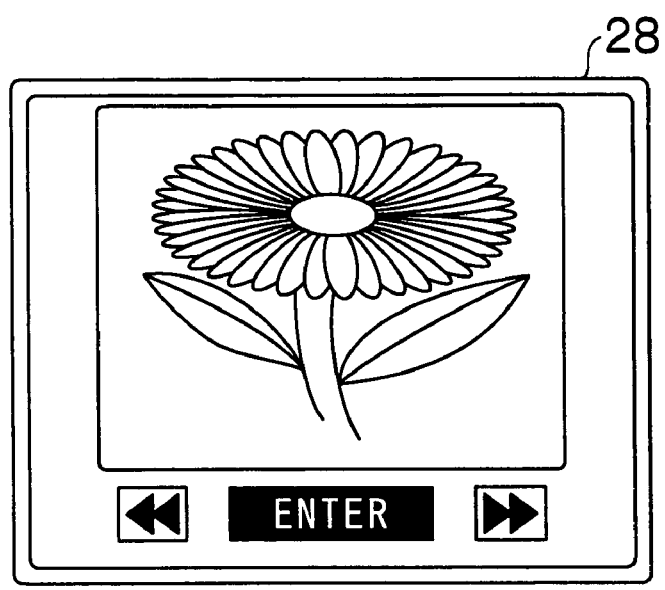
FIGS. 9A to 9C illustrate an "icon picture altering mode" under a "playback mode".

After this, pictures recorded in the recording medium 32 are displayed on the screen of the picture display unit 28 as shown in FIG. 9A. Thus, when folder selection is processed, the CPU 12 detects it and so controls various circuits as to have the picture display unit 28 display an already shot picture. Pictures are played back here in the alphabetical order of folder names assigned to folders as in the case in the "folder creation mode". Frame-by-frame playback of pictures is accomplished with the right or left segment of the cross mark button; pressing the right part results in forward, and pressing the left part results in backward, frame-by-frame playback.

The user causes the picture files recorded in the recording medium 32 to be played back and displayed on the picture display unit 28 sequentially. When the picture to be used as the new icon picture is displayed on the picture display unit 28, the user presses the menu/OK button.

Figure 9B:
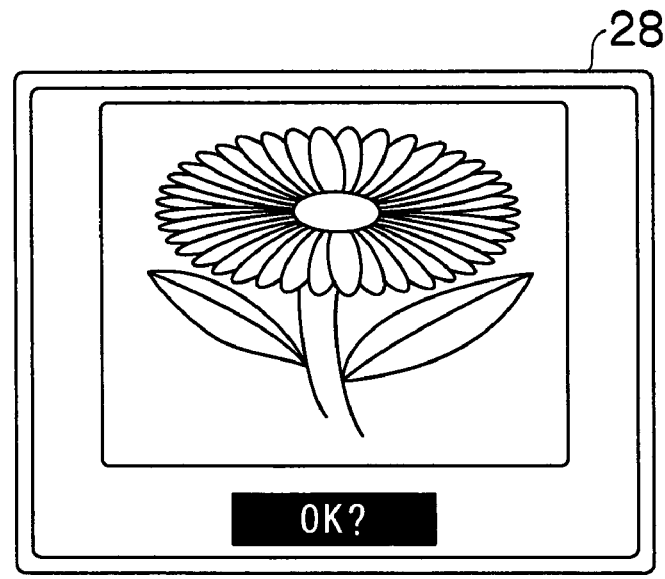

When the menu/OK button is pressed, the selected picture is displayed again on the picture display unit 28 as shown in FIG. 9B. When this picture displayed on the picture display unit 28 is to be used as the new icon picture, the user can press the menu/OK button or, if he or she desires to select another picture, can press the canceling button. If the canceling button is pressed, recorded pictures will be again played back and displayed on the picture display unit 28 and wait for selection.

Figure 9C:
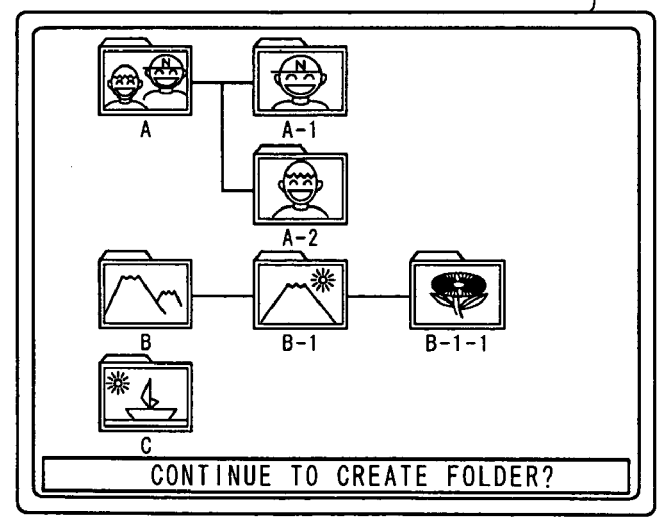

On the other hand, if the menu/OK button is pressed, an icon picture will be newly created on the basis of that shot picture, and the folder management information recorded in the EEPROM 17 will be updated. Thus, the information on the icon picture of the selected folder is overwritten by the newly created icon picture. Then, as shown in FIG. 9C, all the folders existing in the recording medium 32 are displayed in folder icons appended with newly created icon pictures on the picture display unit 28.

In the above-described sequence of actions, the icon picture of a prescribed folder is changed. If any more icon picture is to be changed, the user can press the menu/OK button in a state in which all the folders are displayed as shown in FIG. 9C or, if no more icon picture is to be changed, the user can press the canceling button. If the canceling button is pressed, the CPU 12 will detect it, complete the processing to change icon pictures, and shift the camera to the usual "playback mode".

As described above, when the camera is set to "icon picture changing mode" under the "shooting mode" or the "playback mode", processing to change icon pictures will be performed correspondingly to the pertinent mode.

Next will be described the procedure of operations in the "icon picture deleting mode" in which the icon picture of any already created folder is to be deleted.

The "icon picture deleting mode" is set from a menu screen. Thus, when the menu/OK button is pressed in a state in which the camera is in the "shooting mode" or the "playback mode", a menu screen is displayed on the picture display unit 28 (see FIG. 7A), and the user selects "edit folder" out of the menu options displayed on this menu screen. As the selection of this "edit folder" causes the display on the picture display unit 28 to be changed over to the menu screen of "edit folder" (see FIG. 7B), the user selects "delete icon picture" out of the menu options of this "edit folder". This results in setting the camera in the "icon picture changing mode".

Figure 10A:
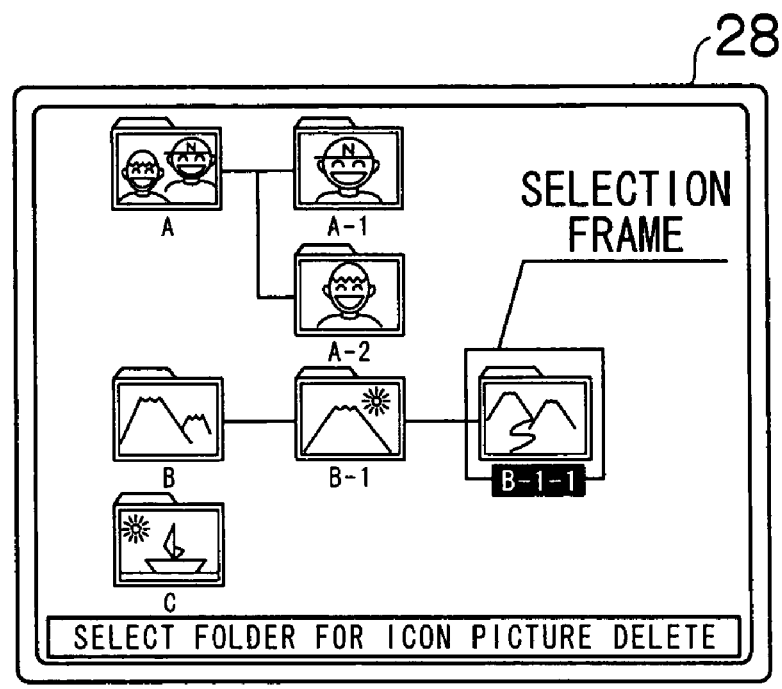

When the camera is set in the "icon picture deleting mode", all the folders existing in the recording medium 32 are displayed in folder icons appended with icon pictures on the picture display unit 28 as shown in FIG. 10A. The user selects the folder whose icon picture is to be deleted out of these folders displayed on the picture display unit 28. For instance, if the icon picture of the folder "A" is to be deleted, the user will select the folder "A" or, if the icon picture of the folder "A-I" is to be deleted, the user will select the folder "A-1". The selection is accomplished by shifting the selection frame with the cross mark button, and is entered by pressing the menu/OK button. The following description will suppose deleting the icon picture of the folder "B-1-1".

Figure 10B:
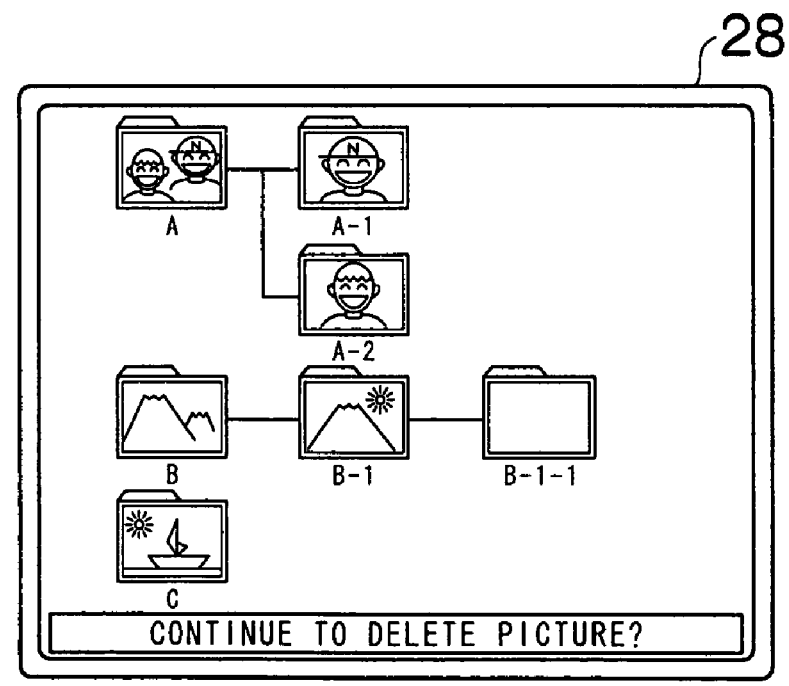

When the folder whose icon picture is to be deleted is selected and the menu/OK button is pressed, the CPU 12 processes the deletion of the icon picture of the selected folder. Thus, it deletes from the folder management information recorded in the EEPROM 17 information on the icon picture of the selected folder. Then, as shown in FIG. 10B, it causes all the folders existing in the recording medium 32 to be displayed in folder icons appended with icon pictures on the picture display unit 28 on the basis of the updated folder management information.

The icon picture of the folder is deleted in the sequence of actions described above. If any more icon picture is to be deleted, the user can press the menu/OK button in a state in which all the folders are displayed as shown in FIG. 10B or, if no more icon picture is to be deleted, the user can press the canceling button. If the canceling button is pressed, the CPU 12 will detect it, complete the processing to delete icon pictures, and shift the camera to the mode before its shift to the "icon picture deleting mode", i.e. either the "shooting mode" or the "playback mode".

Next will be described the procedure of operations in the "folder deleting mode" in which any already created folder is to be deleted.

The "folder deleting mode" is set from a menu screen. Thus, when the menu/OK button is pressed in a state in which the camera is in the "shooting mode" or the "playback mode", a menu screen is displayed on the picture display unit 28 (see FIG. 7A), and the user selects "edit folder" out of the menu options displayed on this menu screen. As the selection of this "edit folder" causes the display on the picture display unit 28 to be changed over to the menu screen of "edit folder" (see FIG. 7B), the user selects "delete folder" out of the menu options of this "edit folder". This results in setting the camera in the "folder changing mode".

Figure 11A:
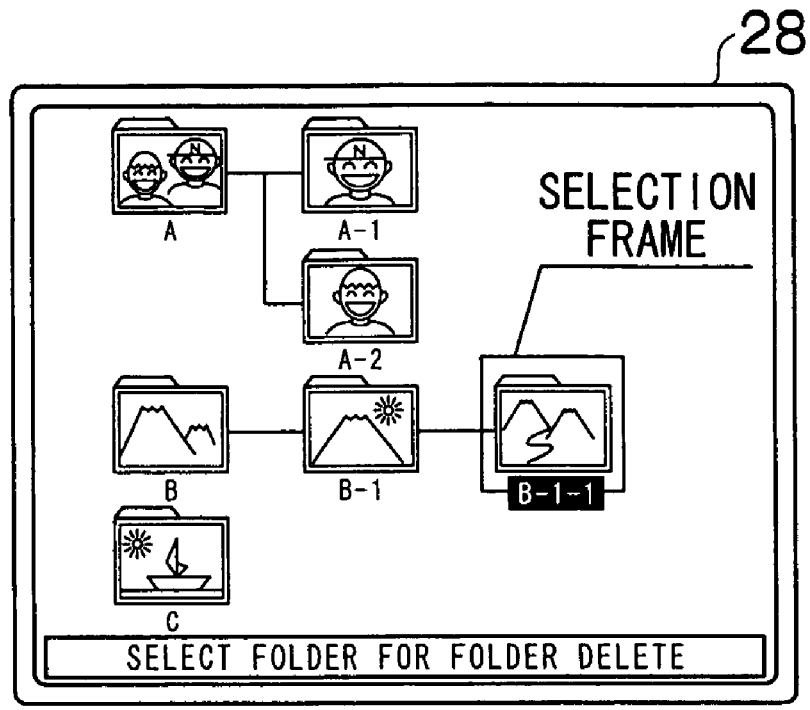
FIGS. 11A to 11B illustrates a "folder deleting mode".

When the camera is set in the "folder deleting mode", all the folders existing in the recording medium 32 are displayed in folder icons appended with icon pictures on the picture display unit 28 as shown in FIG. 11A. The user selects the folder to be deleted out of these folders displayed on the picture display unit 28. For instance, if the folder "A" is to be deleted, the user will select the folder "A" or, if the folder "A-1" is to be deleted, the user will select the folder "A-1". The selection is accomplished by shifting the selection frame with the cross mark button, and is entered by pressing the menu/OK button. The following description will suppose deleting the folder "B-1-1".

Figure 11B:
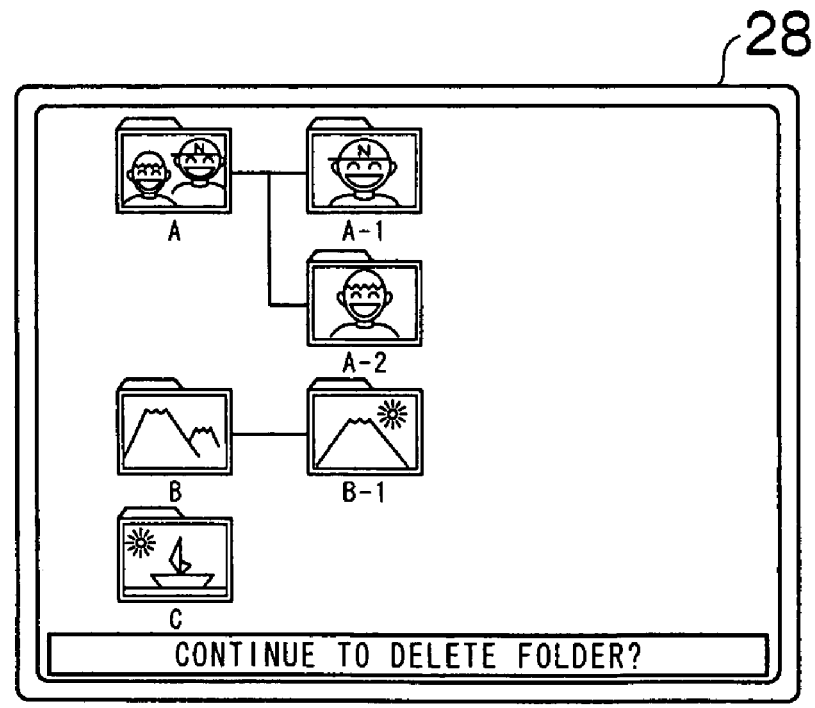

When the folder to be deleted is selected and the menu/OK button is pressed, the CPU 12 detects it and processes the deletion of the selected folder "B-1-1". Thus, it deletes not only the selected folder out of the folders existing in the recording medium 32 but also information on the pertinent folder from the folder management information recorded in the EEPROM 17. Then, as shown in FIG. 11B, it causes all the folders existing in the recording medium 32 to be displayed on the picture display unit 28 on the basis of the updated folder management information.

The folder is deleted in the sequence of actions described above. If any more folder is to be deleted, the user can press the menu/OK button in a state in which all the folders are displayed as shown in FIG. 11B or, if no more folder is to be deleted, the user can press the canceling button. If the canceling button is pressed, the CPU 12 will detect it, complete the processing to delete folders, and shift the camera to the mode before its shift to the "folder deleting mode", i.e. either the "shooting mode" or the "playback mode".

Next will be described the procedure of operations in the "recording folder setting mode" in which a folder to store data of shot pictures are to be stored.

The "recording folder setting mode" is set from a menu screen. Thus, when the menu/OK button is pressed in a state in which the camera is in the "shooting mode" or the "playback mode", a menu screen is displayed on the picture display unit 28 (see FIG. 7A), and the user selects "edit folder" out of the menu options displayed on this menu screen. As the selection of this "edit folder" causes the display on the picture display unit 28 to be changed over to the menu screen of "edit folder" (see FIG. 7B), the user selects "set folder for recording" out of the menu options of this "edit folder". This results in setting the camera in the "recording folder setting mode".

When the camera is set in the "recording folder setting mode", all the folders existing in the recording medium 32 are displayed in folder icons appended with icon pictures on the picture display unit 28 (see FIG. 7C). The user selects the folder in which the shot picture is to be recorded out of these folders displayed on the picture display unit 28. For instance, if the shot picture is to be recorded in the folder "A", the user will select the folder "A" or, if the shot picture is to be recorded in the folder "A-1", the user will select the folder "A-1". The selection is accomplished by shifting the selection frame with the cross mark button, and is entered by pressing the menu/OK button.

When the folder in which the shot picture is to be recorded is selected and the menu/OK button is pressed, the CPU 12 detects it and so controls the recording of picture files that the pertinent picture file to be recorded in the selected folder.

Incidentally, if the recording medium 32 is formatted, the folder "A" will be automatically created immediately underneath the root folder "ROOT" in the recording medium 32, and the shot picture will be recorded in that folder "A".

Further, if the folder "A" is set to accept the recording of initial setting and the setting of the folder for recording is not processed, picture files will be automatically recorded in this folder "A".

Next will be described the procedure of operations in the "all folder displaying mode" in which all the folders existing in the recording medium 32 are displayed in folder icons appended with icon pictures on the picture display unit 28.

The "all folder displaying mode" is set from a menu screen. Thus, when the menu/OK button is pressed in a state in which the camera is in the "shooting mode" or the "playback mode", a menu screen is displayed on the picture display unit 28 (see FIG. 7A), and the user selects "edit folder" out of the menu options displayed on this menu screen. As the selection of this "edit folder" causes the display on the picture display unit 28 to be changed over to the menu screen of "edit folder" (see FIG. 7B), the user selects "display all folders" out of the menu options of this "edit folder". This results in setting the camera in the "all folder displaying mode".

When the camera is set in the "all folder displaying mode", all the folders existing in the recording medium 32 are displayed in folder icons appended with icon pictures on the picture display unit 28 (see FIG. 7C). The user grasps the folder structure by looking at this display on the picture display unit 28.

When the displaying is to be ended, the menu/OK button is pressed. When the menu/OK button is pressed, the CPU 12 detects it and shifts the camera to its mode immediately before the shift to the "all folder displaying mode", i.e. either the "shooting mode" or the "playback mode".

As described so far, the electronic camera 10 in this mode of implementing the invention can hierarchically create folders in the recording area of a recording medium, and display the whole of that hierarchical folder structure in folder icons appended with icon pictures on the picture display unit 28. And it can record data of shot pictures in any desired one of those hierarchically structured folders.

Incidentally, when it runs out of an unused part of the capacity of the recording medium 32, the electronic camera 10 can no longer record picture data. For this reason, when the recording medium 32 has no more unused part of its capacity, the recording medium 32 has to be replaced.

In regard to this problem, the electronic camera 10 in this mode of implementation can, when the recording medium 32 is replaced, have the replacing recording medium 32 take over the folder management information created before the replacement from the replaced recording medium 32, so that folders of the same structure as those created in the replaced recording medium 32 can be carried over by the replacing recording medium 32.

Figure 12:
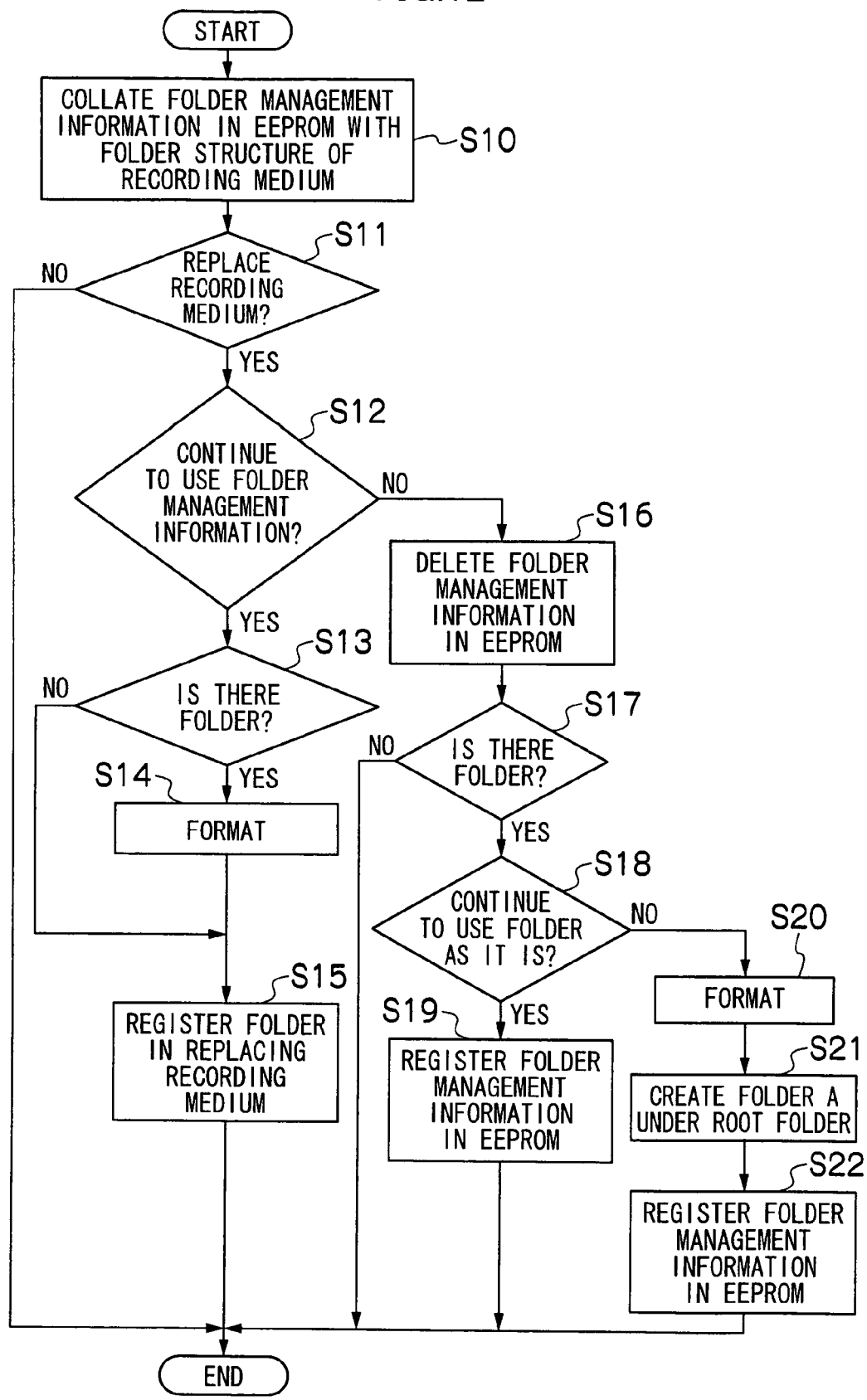

The procedure of handing over folder management information when the recording medium is replaced will be described below with reference to a flow chart shown in FIG. 12.

When power supply to the electronic camera 10 is turned on, the CPU 12 recognizes the folder structure of the recording medium 32, and collates it with folder management information stored in the EEPROM 17 (step S10). It then judges whether or not they are identical, and determines on that basis whether or not the recording medium 32 has been replaced (step S11).

Similarly, when the recording medium 32 is withdrawn from the medium socket 30 and a new recording medium 32 is loaded, the folder structure of the newly loaded recording medium 32 is recognized and collated with folder management information recorded in the EEPROM 17 (step S). It then judges whether or not they are identical, and determines on that basis whether or not the newly loaded recording medium 32 differs from the replaced recording medium 32 (step S11).

Incidentally, the judgment as to whether or not the recording medium 32 is loaded in the medium socket 30 (card detection) is made on the basis of, for instance, electrical connection between a terminal provided on the recording medium side and another provided on the medium socket side.

If it is judged at step 11 above that the recording medium 32 has not been replaced, the loaded recording medium 32 will continue to be used.

Figure 13A:
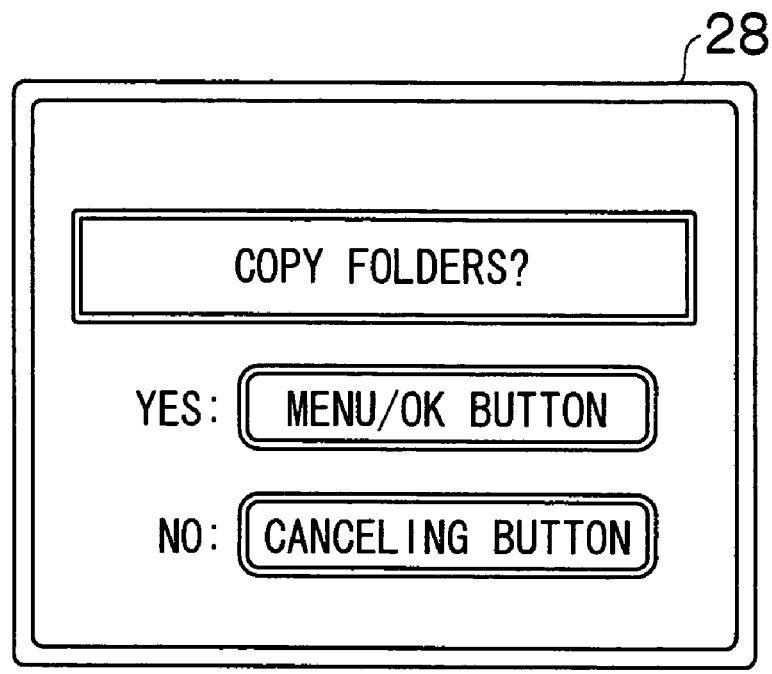
FIGS. 13A to 13B show examples of message displayed when the recording medium is replaced.

On the other hand, if it is judged that the recording medium 32 has been replaced, the CPU 12 will judge, on the basis of the operational device 26, whether or not the replacing recording medium 32 may continue to use the folders created in the replaced recording medium 32 (step S12). Thus the CPU 12, if it judges that the recording medium 32 has been replaced, will cause the picture display unit 28 to display a message asking whether or not the replacing recording medium will continue to use the folders created in the replaced recording medium ("Copy folders?") as shown in FIG. 13A. Seeing this message, the user determines whether or not to continue to use the folders existing in the replaced recording medium. If the user determines to continue to use them, he or she will press the menu/OK button or, if not, press the canceling button. The CPU 12, on the basis of this input from the operational device 26, judges whether or not the folders existing in the replaced recording medium 32 will continue to be used by the replacing recording medium 32.

If the CPU 12 detects here the pressing of the menu/OK button and judges that the folders will remain in use, it will then judge whether or not any folder is created in the replacing recording medium 32 (step S13). If it has judged that any folder is created in the replacing recording medium 32, the CPU 12 will format the replacing recording medium 32 (step S14), and then creates in the replacing recording medium 32 folders of the same structure as those existing in the replaced recording medium on the basis of folder management information on the replaced recording medium recorded in the EEPROM 17 (step S15). This makes it possible for the replacing recording medium to use folders of the same structure as those existing in the replaced recording medium.

Incidentally, as the folder management information recorded in the EEPROM 17, that of the replaced recording medium continues to be used, and all the folders are displayed in folder icons appended with icon pictures are displayed on the picture display unit 28 on the basis of this folder management information.

On the other hand, it the CPU 12 detects at step 12 the pressing of the canceling button and judges that folders created before the replacement will not remain in use, it will delete the folder management information of the replaced recording medium recorded in the EEPROM 17 (step S16).

Figure 13B:
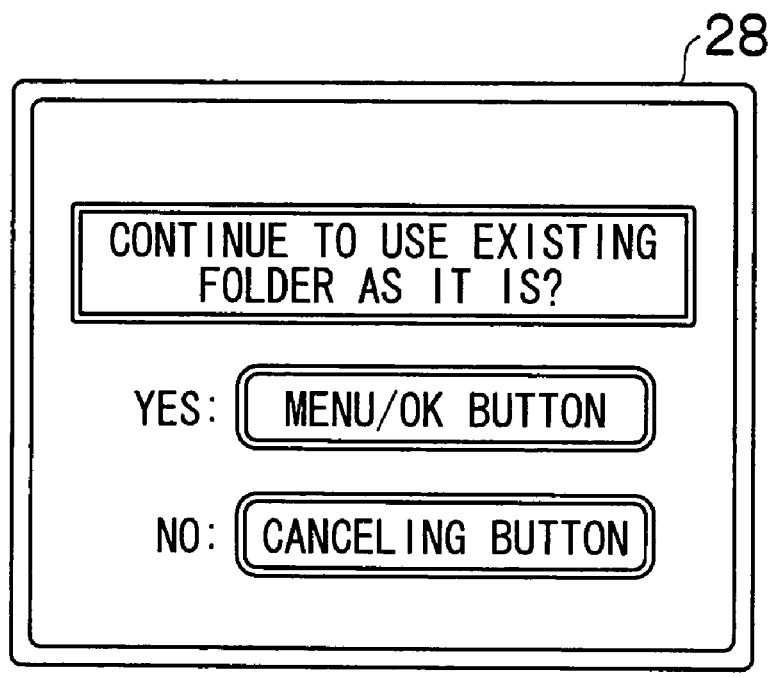

After that, the CPU 12 judges whether or not any folder is created in the replacing recording medium 32 (step S17) and, if any is, will further determine whether or not that folder is to remain in use on the basis of an input from the operational device 26 (step S18). Thus, if any folder is created in the replacing recording medium 32, the CPU 12 will cause a message asking whether or not the folder created in the replacing recording medium is to remain in use ("Continue to use existing folder as it is?") to be displayed on the picture display unit 28 as shown in FIG. 13B. Seeing this message, the user will press the menu/OK button if the folder existing in the replacing recording medium 32 is to remain or use or, if it is not to be used, press the canceling button. The CPU 12 determines whether or not the folder existing in the replacing recording medium 32 to remain in use on the basis of this input from the operational device 26.

If here the pressing of the menu/OK button is detected and it is determined that the folder existing in the replacing recording medium 32 will remain in use, the CPU 12 will create new folder management information on the basis of the folder structure existing in the replacing recording medium and records it in the EEPROM 17 (step S19). After that, recording of picture files is processed by utilizing the folder existing in this replacing recording medium 32.

On the other hand, if the pressing of the canceling button is detected and it is determined that the folder existing in the replacing recording medium 32 will no longer be used, that replacing recording medium 32 will be formatted (step S20). After that, a folder "A" will be created at the level underneath the root folder in the formatted recording medium 32 (step S21). Then, folder management information will be created on the basis of the new folder structure and recorded in the EEPROM 17 (step S22). If no folder creation is processed, shot picture files will be thereafter recorded in this folder "6A").

Also, if it is judged at step 17 above that no folder exists in the replacing recording medium 32 (if the recording medium is judged to be already formatted), the CPU 12 will create a folder "A" at the level underneath the root folder (step S21). Then, folder management information will be created on the basis of the new folder structure and recorded in the EEPROM 17 (step S22).

In this way, the electronic camera 10 in this mode of implementation, even when the recording medium has been replaced, can continue to use folders existing in the replaced recording medium in the replacing recording medium. This saves the trouble of setting the folders anew every time the recording medium is replaced, resulting in improved handling ease. Moreover, since folders of the same structure can continue to be used even if the recording medium is replaced, data can be easily classified and put in order.

To add, although icon pictures in each folder is recorded together with the folder structure in the EEPROM 17 as folder management information in this mode of implementing the invention, it is acceptable to record only the folder structure.

Furthermore, the description of this mode of implementing the invention referred to an electronic camera capable of recording and playing back still pictures, the application of the invention is not limited to this, but also includes other electronic apparatuses such as digital video cameras capable of recording and playing back motion pictures, camera-equipped cellular phones, PDA and personal computers in addition to electronic cameras.

What is claimed is:

1. An electronic apparatus which records data on a replaceable recording medium comprising:
    a folder information recording device which records information of folder structure created in the recording medium;
    a detecting device which detects replacement of the recording medium;
    a selecting device which, in the case where the replacement of the recording medium has been detected by the detecting device, causes selection to be made as to whether or not folders of the same structure as folders existing in the replaced recording medium are to be created in the replacing recording medium;
    a device which, when the selecting device selects creation of the folders of the same structure as the folders created in the replaced recording medium in the replacing recording medium, determines whether the folders are created in the replacing recording medium;
    a device which formats the replacing recording medium if it is determined that the folders are created in the replacing recording medium;
    a device which creates the folders of the same structure as the folders existing in the replaced recording medium in the formatted replacing recording medium on the basis of information recorded in the folder information recording device, wherein content of the folders existing in the replaced recording medium is not copied;
    a device which deletes the information recorded in the folder information recording device in the case where the selection is made by the selecting device not to create the folders of the same structure as the folders existing in the replaced recording medium in the replacing recording medium;
    a device which determines whether the folders are created in the replacing recording medium in the case where the selection is made by the selecting device not to create the folders of the same structure as the folders existing in the replaced recording medium in the replacing recording medium;
    a device which causes selection to be made as to whether to use the folders created in the replacing recording medium as-is when determined that the folders are created in the replacing recording medium;
    a device which records the information of the folder structure created in the replacing recording medium in the folder information recording device in the case where the selection is made to use the folders created in the replacing recording medium as-is;
    a device which formats the replacing recording medium in the case where the selection is made not to use the folders created in the replacing recording medium as-is and then newly creates folders in the replacing recording medium and records the information of the folder structure created in the recording medium in the folder information recording device; and
    a device which newly creates folders in the replacing recording medium and records the information of the folder structure existing in the recording medium in the folder information recording device.

2. The electronic apparatus according to claim 1, further comprising:
    a display control device which causes a display device to display all the folders existing in said recording medium in folder icons appended with pictures on the basis of information recorded in said folder information recording device, wherein:
    said folder information recording device records information on pictures to be appended to folder icons of individual folders together with information on the folder structure existing in said recording medium.

3. The electronic apparatus according to claim 1, wherein, at power-on of the electronic apparatus and on mounting the recording medium, the detecting device which detects the replacement of the recording medium recognizes the folder structure created in the recording medium, checks it against the information recorded in the folder information recording device and determines whether or not they match so as to detect whether or not the recording medium has been replaced.

4. The electronic apparatus according to claim 2, wherein, at power-on of the electronic apparatus and on mounting the recording medium, the detecting device which detects the replacement of the recording medium recognizes the folder structure created in the recording medium, checks it against the information recorded in the folder information recording device and determines whether or not they match so as to detect whether or not the recording medium has been replaced.

5. The apparatus of claim 1, wherein said detecting device detects replacement of said recording medium by comparing the folder structure recorded in the folder information recording device with information of folder structure in the replacing recording medium.

6. The apparatus of claim 1, wherein the detecting device further detects the replacement based upon a detection of an electrical connection between a terminal on the replacing recording medium and a terminal on a recording medium connector.

7. The electronic apparatus according to claim 1, wherein the device which newly creates folders in the replacing recording medium automatically creates the folders in the replacing recording medium.

* * * * *